US012586696B2

(12) United States Patent
Hanna

(10) Patent No.: US 12,586,696 B2
(45) Date of Patent: Mar. 24, 2026

(54) MAGNETIZED CABLES FOR IMPROVED CABLE MANAGEMENT

(71) Applicant: Reaction Labs, LLC, Austin, TX (US)

(72) Inventor: John Hanna, Austin, TX (US)

(73) Assignee: Reaction Labs, LLC, Austin, TX (US)

( * ) Notice: Subject to any disclaimer, the term of this patent is extended or adjusted under 35 U.S.C. 154(b) by 0 days.

(21) Appl. No.: 18/942,768

(22) Filed: Nov. 10, 2024

(65) Prior Publication Data

US 2026/0051425 A1 Feb. 19, 2026

Related U.S. Application Data

(63) Continuation-in-part of application No. PCT/US2024/013355, filed on Jan. 29, 2024.

(60) Provisional application No. 63/683,550, filed on Aug. 15, 2024.

(51) Int. Cl.
*H01B 7/40* (2006.01)
*H01B 7/08* (2006.01)
*H01B 13/00* (2006.01)

(52) U.S. Cl.
CPC ........... *H01B 13/0036* (2013.01); *H01B 7/40* (2013.01); *H01B 7/08* (2013.01)

(58) Field of Classification Search
CPC ......... H01B 13/0036; H01B 7/08; H01B 7/40
USPC ........................................................ 174/70 R
See application file for complete search history.

(56) References Cited

U.S. PATENT DOCUMENTS

| | | | | |
|---|---|---|---|---|
| 3,229,030 A * | 1/1966 | Baermann | E05C 19/161 | 29/608 |
| 5,710,812 A * | 1/1998 | Fogel | H04M 1/15 | 379/438 |
| 6,048,601 A * | 4/2000 | Yahagi | C22C 33/0278 | 428/920 |
| 6,225,556 B1 | 5/2001 | Saito | | |
| 6,707,361 B2 | 3/2004 | Blume | | |
| 7,202,416 B2 * | 4/2007 | Komuro | H01B 3/30 | 174/110 R |
| 7,342,172 B1 | 3/2008 | Wang et al. | | |
| 7,692,099 B2 | 4/2010 | Burke | | |
| 11,011,284 B1 * | 5/2021 | Li | H01F 7/021 | |
| 11,756,703 B1 | 9/2023 | Yue | | |
| 11,929,191 B1 | 3/2024 | Yue | | |
| 2004/0055772 A1 | 3/2004 | Tsutsui et al. | | |

(Continued)

FOREIGN PATENT DOCUMENTS

| | | |
|---|---|---|
| CN | 102416685 B | 12/2013 |
| CN | 203673868 U | 6/2014 |

(Continued)

OTHER PUBLICATIONS

European Search Report, European Application No. 24747947.0-1201, mailed Oct. 17, 2025.

(Continued)

*Primary Examiner* — Timothy J Thompson
*Assistant Examiner* — Michael F McAllister
(74) *Attorney, Agent, or Firm* — Jackson Walker L.L.P.

(57) ABSTRACT

A disclosed magnetized cable produces a persistent magnetic field configured to aid in aligning and maintaining alignment of the cable while the cable is being looped, wound, or otherwise coiled for storage or transport and, when the cable is in a coiled state, maintaining the cable in coiled state while also permitting a user to easily uncoil the cable by hand.

30 Claims, 21 Drawing Sheets

(56) References Cited

U.S. PATENT DOCUMENTS

| | | | | |
|---|---|---|---|---|
| 2009/0314515 | A1 | 12/2009 | Bevirt et al. | |
| 2011/0308835 | A1* | 12/2011 | Piekny | H02G 11/02<br>174/69 |
| 2014/0332264 | A1 | 11/2014 | Chen et al. | |
| 2015/0170798 | A1 | 6/2015 | Chen et al. | |
| 2015/0187468 | A1 | 7/2015 | Kulas | |
| 2016/0293295 | A1 | 10/2016 | Huang et al. | |
| 2016/0295754 | A1 | 10/2016 | Huang et al. | |
| 2019/0083192 | A1* | 3/2019 | Spindler | A61M 27/008 |
| 2020/0161731 | A1 | 5/2020 | Himi et al. | |
| 2021/0074450 | A1 | 3/2021 | Harris, Sr. | |
| 2021/0350963 | A1 | 11/2021 | Yan et al. | |

FOREIGN PATENT DOCUMENTS

| | | | |
|---|---|---|---|
| CN | 205882348 | U | 1/2017 |
| CN | 106711725 | A | 5/2017 |
| CN | 106711728 | A | 5/2017 |
| CN | 206532997 | U | 9/2017 |
| CN | 207925840 | U | 9/2018 |
| CN | 207925846 | U | 9/2018 |
| CN | 211655236 | U | 10/2020 |
| CN | 212392445 | U | 1/2021 |
| CN | 213717212 | U | 7/2021 |
| CN | 113674921 | A | 11/2021 |
| CN | 215643841 | U | 1/2022 |
| CN | 216053973 | U | 3/2022 |
| CN | 216750587 | U | 6/2022 |
| CN | 217036223 | U | 7/2022 |
| CN | 115352012 | A | 11/2022 |
| CN | 218569455 | U | 3/2023 |
| WO | 2005083724 | A1 | 9/2005 |

OTHER PUBLICATIONS

International Search Report and Written Opinion of the International Searching Authority, International Application No. PCT/US25/040011, mailed Sep. 18, 2025.

* cited by examiner

MAGNETIZED CABLES FOR IMPROVED CABLE MANAGEMENT

CROSS REFERENCE TO RELATED APPLICATIONS

This application: is a continuation-in-part (CIP) of international application PCT/US2024/13355, filed Jan. 29, 2024, which claims the benefit of U.S. application Ser. No. 18/339,272, filed Jun. 22, 2023, now U.S. Pat. No. 11,972, 881, issued Apr. 30, 2024, which claims the benefit of U.S. App. No. 63/482,006, filed Jan. 27, 2023; claims the benefit of U.S. App. No. 63/683,550, filed Aug. 15, 2024; each of which is incorporated by reference, in its entirety, herein.

TECHNICAL FIELD

This application generally pertains to cables used with electronic products and, more specifically, management of such cables.

BACKGROUND

Electronics products such as laptop computers, smartphones, etc. often use cables for input and output of power, data, audio, etc. When not in use, such cables frequently become entangled, causing frustration for the user.

SUMMARY

Subject matter included herein discloses a magnetized cable with an elongated flexible body component that produces a persistent magnetic field that facilitates and actively assists a user in manipulating the cable into a compact state suitable for storage. The persistent magnetic field may aid in aligning and maintaining alignment of the cable while the cable is being looped, wound, or otherwise coiled for storage or transport and, when the cable is in a coiled state, maintaining the cable in coiled state while also permitting a user to easily uncoil the cable by hand.

In one aspect, a disclosed magnetized cable includes one or more electrically conductive wires and an elongated flexible magnetized component (EFMC). The EFMC includes a pliable binder comprised primarily of a polymer and magnetic particles distributed on and/or within the polymer. The magnetized cable may further include at either or both ends, a connector and a rotatable grip.

The EFMC may function as a flexible permanent magnet that produces a persistent magnetic field wherein at least one portion of the EFMC is magnetically attracted to at least one other portion of the EFMC. As a representative example for an EFMC that features a rectangular cross section defining a pair of major surfaces, the first major surface, or a portion thereof, may be magnetically attached to the second major surface, or a portion thereof.

Magnetic attraction between the first and second EFMC portions may be sufficient to actively assist a user who is manually coiling the magnetized cable into a compact, multiple loop state, referred to herein as a coiled state, suitable for storage or another purpose. In addition, the magnetic attraction may be sufficient to retain the magnetized cable in its coiled state without assistance. Further, the EFMC may be configured wherein the magnetic attraction is not so strong that it would prevent a user from manually uncoiling the EFMC for use. The EFMC may be heat treated or otherwise fabricated such that its coiled state conforms to a compact form factor suitable for storage, transport, display, etc. Magnetized cables in accordance with disclosed teachings may conform with any number of suitable form factors. For the sake of clarity and brevity, form factors illustrated in the drawing figures and described in the accompanying detailed description are limited to a spiral form factor and a helical form factor. In its coiled state, a spiral form factor magnetized cable constitutes or defines a spiral including two or more concentric and coplanar overlapping loops of increasing diameter. In its coiled state, a helical form factor magnetized cable constitutes or defines a helix including two or more concentric loops wherein each successive loop is vertically displaced from and overlies, at least in part, its preceding loop. Helical form factors may be cylindrical, wherein each loop has the same diameter, or conical, wherein the diameter of each successive loop is incrementally smaller or larger than the diameter of its preceding loop.

Disclosed magnetized cables include embodiments featuring various cross section geometries. In at least some cross section embodiments, a width of the cable cross section is greater than a height of the cross section. Such embodiments include rectangular cross section embodiments and variations thereof. In such embodiments, the cross section may feature a pair of continuous and substantially parallel major surfaces. In addition, when the EFMC is in a multi-loop coiled state, the first major surface along one loop is in contact with or in very close proximity to the second surface of the next loop. The persistent magnetic field produced by EFMC maybe be configured such that the first major surface comprises or lies within a first polarity region of the magnetic field, e.g., a north polarity region of the magnetic field, while the second major surface comprises or lies within a second polarity region of the magnetic field, e.g. a south polarity region. In a variation, the first and second major surfaces may include subportions of alternating polarity to produce two or more adjacent magnetic fields of opposing polarities.

Disclosed magnetized cables include embodiments with various configurations of electrically conductive stranded or solid wires of copper, another suitable electrically conductive metal, and alloys thereof. Electrically conductive wire configurations may include one or more individual wires, one or more twisted bundles of two or more individual wires, and one or more stretchable wires. In addition, disclosed wires may be embedded within the EFMC and/or routed alongside the EFMC. Wires may be insulated or bare. Insulated wires may be insulated with a non-biodegradable and chemically inert polymer such as polytetrafluoroethylene (PTFE).

A spiral form factor magnetized cable may include one or more embedded wires and/or one or more twisted bundles. In at least some such embodiments, a central axis of the embedded wire(s) and/or the twisted bundles may be vertically aligned with a central plane of the EFMC. Embodiments of the EFMC include low-profile embodiments in which a vertical dimension of the EFMC is substantially equal to an outer diameter of the embedded wire(s) and/or the embedded twisted bundle(s). In these embodiments, little or no EFMC is present above or below the embedded wire(s) and/or embedded bundle(s). One or more wires and/or twisted bundles may be routed alongside the EFMC. In some embodiments, the EFMC perimeter may define one or more grooves extending a length of the EFMC and the wires routed alongside the EFMC may be routed within the grooves.

Disclosed helical form factor magnetized cables may include embodiments in which stretchable wires and/or stretchable twisted bundles may be employed to accommodate variations in stress when the helical form factor cable is coiled into its helical form factor. In such embodiments, any conventional, non-stretchable wires or twisted bundles may be located wherein the central axis of the wire or twisted bundle is aligned with the central axis of the EFMC.

Disclosed magnetized cables may include a braided or continuous sheath surrounding the EFMC the one or more electrically conductive wires. The sheath may be a braided sheath constructed of stretchable and/or waxed yarns including, as illustrative examples, latex, spandex, and elastane. Continuous sheaths may include a low friction polymer such as PTFE.

Embodiments of the magnetized cables may include a dry or other type of lubricant or surface coating applied to the electrically conductive wires, the EFMC, and/or the sheath.

In one aspect, disclosed magnetized cables include an elongated flexible magnetized component (EFMC) and one or more bare or insulated electrically conductive wires. The EFMC is fabricated to produce a persistent magnetic field wherein at least some portion of the magnetized cable is magnetically attracted to at least some other portion of the magnetized cable when the two portions are in proximity to one another such as when the magnetized cable is coiled or being coiled. The EFMC may include a pliable polymer base or binder comprised of rubber, silicon, silicon-rubber, chlorinated polyethylene, or another suitable material, in combination with a plurality of magnetic particles randomly or otherwise distributed within and/or upon the pliable polymer base. The magnetic particles may include particles of any suitable magnetic element, compound, or alloy including, as non-limiting examples, ferrite, iron, cobalt, nickel, neodymium, ferric oxide, alnico, samarium and so forth. The magnetic particles may be produced by grinding or otherwise processing magnetic materials.

The EFMC may be fabricated by extruding, molding, or otherwise processing the pliable polymer binder to produce an elongated flexible component, which may be cut to any desired length. The magnetic particles may be combined with the pliable polymer binder during and/or after formation of the elongated flexible component. The magnetic particles may then be magnetically aligned by exposing the elongated flexible component to a strong magnetic field produced by one or more magnets. Varying arrangements of north and south poles may be used to strengthen the resulting magnetic pull of the EFMC.

In at least one embodiment, the magnetic cable has a substantially rectangular cross section defining first and second substantially planar and parallel major surfaces and the persistent magnetic field is configured wherein the first major surface lies within a first polarity region of the persistent magnetic field and the second major surface lies within a second polarity region of the persistent magnetic field, thus providing a magnetic attraction between the major surfaces when they are in proximity to each other such as during coiling of the cable or when the cable is already in a coiled state. In some embodiments, the cross section may have an aspect ratio, e.g., width to height ratio in the range of approximately 2 to 10.

In some embodiments, one or more of the wires may be embedded within and surrounded by the EFMC. In some embodiments, the EFMC may define one or more elongated grooves to accommodate one or more of the wires. The magnetized cable may further include a cable jacket or sheath enclosing and securing the one or more electrically conductive wires and the EFMC. In sheathed embodiments, the sheath may be comprised of a polymer such as plastic, nylon, rubber, or another suitable material, enclosing and securing the EFMC and the wires. The sheath may be implemented with a braided or woven textile. The textile may be natural or synthetic.

In another aspect, a disclosed method for fabricating a magnetized cable includes forming an elongated flexible component, incorporating magnetic particles into and/or upon the elongated flexible component, and magnetizing the flexible component by exposing the flexible component to a strong magnetic field produced by one or more magnets to produce the EFMC as a flexible permanent magnet wherein at least some portion of the EFMC, e.g., a first major surface of the EFMC, is magnetically attracted to at least some other portion of the EFMC, e.g., a second major surface of the EFMC. The portions of the EFMC that are magnetically attracted may be configured to assist or otherwise facilitate the process of coiling or winding the magnetized cable for storage. One or more electrically conductive wires may be incorporated within or adjacent to the EFMC and an optional sheath may be formed to enclose and secure the EFMC and the one or more wires. The EFMC and the one or more wires may then be cut to a desired length. Electrical connectors may be affixed at either end of the magnetized cable. The elongated flexible component may comprise a polymer selected from rubber, silicon, silicon-rubber, or chlorinated polyethylene or other material.

A cross section of the magnetized cable may be substantially rectangular and the persistent magnetic field may include a first polarity region corresponding to a first major surface defined by the substantially rectangular cross section and a second polarity region corresponding to a second major surface defined by the substantially rectangular cross section.

Incorporating the one or more electrically conductive wires may include forming the EFMC around the one or more electrically conductive wires such that the wires are embedded in the EFMC. Alternatively, the wires may incorporated adjacent to, but not embedded within the EFMC. These embodiments may further include enclosing the EFMC and the one or more electrically conductive wires in a sheath of braided nylon or another suitable material wherein the wires are positioned in voids defined by the sheath and the EFMC.

In one aspect, disclosed magnetized cable assemblies include one or more electrically conductive wires and an elongated flexible magnetized component (EFMC). The EFMC IS capable of being coiled or straight and configured to produce a persistent magnetic field. In at least some embodiments, one or more portions of the EFMC are magnetically attracted to one or more other portions of the EFMC in the coiled position and the EFMC may include a pliable binder comprised primarily of a polymer and magnetic particles distributed within the pliable binder, wherein the EFMC functions as a permanent magnet that produces a persistent magnetic field.

The EFMC may have a rectangular cross section in which the dimension of the cross section along a first axis is greater than a dimension of the cross section along a second axis that is perpendicular to the second axis. The EFMC cross section may define or include a pair of major surfaces in contact or in substantially close proximity to whenever the cable is coiled. A first major surface may lie within a first polarity region, e.g., north pole, of the persistent magnetic field and a second major surface may lie within a second polarity region, i.e., south pole, of the persistent magnetic field. In at least some embodiments, first and second polarity regions of the EFMC contain an alternating arrangement of north and south poles.

Disclosed magnetized cables may include magnetized cables in two or more form factors including a spiral form factor, a helical form factor, and/or any other suitable form factors. The spiral form factor may include a winding in a continuous and gradually widening curve around a central point on a flat plane. A second form factor of the cable may include a helical form factor, wherein a helix may be defined as an object having a three-dimensional shape like that of a wire wound uniformly in a single layer around a cylinder or cone, as in a corkscrew or spiral staircase.

One or more wires may be embedded in the EFMC and wherein a central axis of at least one of the one or more wires and a central plane of the EFMC are vertically aligned. One or more twisted bundles, each including two or more wires are embedded in the EFMC wherein a central axis of at least one of the one or more twisted bundles and a central plane of the EFMC are vertically aligned. Disclosed EFMCs include low profile EFMCs wherein substantially no portion of the EFMC resides above or below at least one of the one or more wires. In some embodiments, one or more wires are routed alongside the EFMC. In at least some of these embodiments, no stranded wires or twisted bundles are included in the EFMC itself. In other embodiments, wires and twisted bundles may be present embedded with the EFMC and along side the EFMC.

Embodiments may further include one or more stretchable wires embedded in the EFMC and wherein a central axis of at least one of the one or more stretchable wires and a central plane of the EFMC are aligned. In some embodiments, one or more stretchable wires are routed alongside the EFMC and wherein a central axis of at least one of the one or more stretchable wires and a central plane of the EFMC are aligned.

Disclosed methods for fabricating a magnetized cable may include compounding a polymer and magnetic particles to produce a compound, extruding the compound around one or more wires to create an EFMC with one or more embedded wires, cutting the EFMC and one or more wires to a desired length and installing an electrical connector at each end of the EFMC. The cable may then be subjected to a large magnitude magnetic field, e.g., have a flux density of greater than 5 T, To magnetize the EFMC. In helical form factor embodiments, the EFMC and wires may be positioned in a helical shape before and while heat treating the EFMC and wires to impart a persistent helical shape to the EFMC. In at least some embodiments, stretchable wires may be routed alongside the EFMC. In helical form factor embodiments of the EFMC, the EFMC and wires may be positioned in a helical shape and subject to a heat treating operation to impart a persistent helical shape to the EFMC.

In some embodiments, braided sheath surrounding the EFMC and the one or more wires constructed of stretchable yarns include any one or more of: latex, spandex, and elastane. A lubricant, e.g., a dry lubricant, or surface coating may be applied to one or more components selected from the wires, the EFMC, and/or the sheath. The stranded wires may include a wire insulation and wherein the wire insulation is comprised of at least one of: PTFE and a low friction polymer other than PTFE. a braided sheath may be constructed of waxed yarn surrounding the EFMC and the one or more wires.

Embodiments may include a sheath surrounding the EFMC and the one or more wires and the wherein the sheath is comprised of at least one of: PTFE and another low friction polymer. The magnetized cable may have a preferred and persistent shape imparted by a heat treating process. The magnetized cable may include at least one rotating grip.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
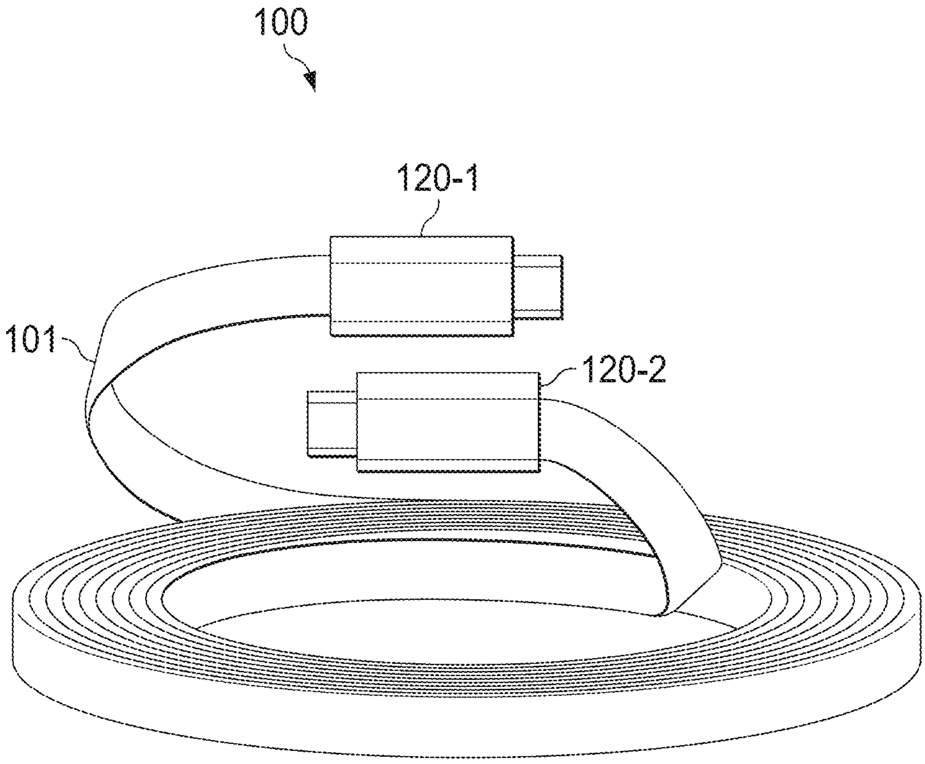
FIG. 1 illustrates a perspective view of a magnetized cable.

Exemplary embodiments and their advantages are best understood by reference to FIGS. 1-28, wherein like numbers are used to indicate like and corresponding parts unless expressly indicated otherwise.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

Referring now to the drawings, FIG. 1 illustrates a perspective view of a magnetized cable assembly 100 including an EFMC 101 including one or more bare or insulated electrically conductive wires (not visible in FIG. 1) connected to electrical connectors 120-1 and 120-2 at either end of EFMC 101. EFMC 101 incorporates magnetic particles that have been magnetized to produce a persistent magnetic field in which some surface regions of EFMC 101 lie within a north pole region of the magnetic field and other surface regions of EFMC 101 lie within a south pole region of the magnetic field. In at least some embodiments, an orientation and strength of the persistent magnetic field, in combination with the geometry and dimensions of EFMC 101, enable efficient storage and handling of EFMC 101 by facilitating a coiling of EFMC 101 from an extended or uncoiled state and, when EFMC 101 is coiled, maintaining EFMC 101 in the coiled state while also permitting easy manually uncoiling of EFMC 101 from the coiled state.

Embodiments of EFMC 101 may have a rectangular or substantially rectangular cross section including an opposing pair of substantially planar and parallel major surfaces and a pair of substantially planar and parallel minor surfaces. In these rectangular embodiments, the persistent magnetic field may be oriented to produce a north pole region encompassing one of the major surfaces and a south pole region encompassing the other major surface. Those of ordinary skill in the field will appreciate that, in such embodiments, EFMC 101 features a north pole surface and a south pole surface that come in contact with each other when the cable is coiled or otherwise wound on itself, e.g., prior to storing EFMC 101 when not in use. Those of ordinary skill will further appreciate that EFMC 101 is not limited to rectangular configurations and that the storage and handling benefits of EFMC 101 may be realized in other configurations including, without limitation, circular and other elliptical cross section configurations.

Figure 2:
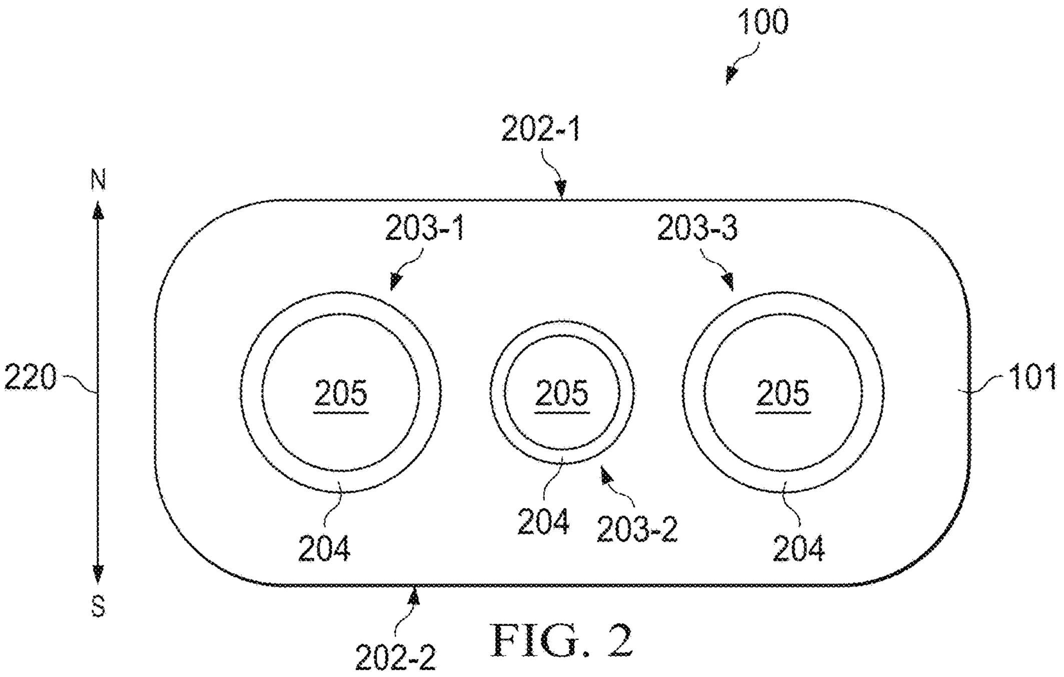
FIG. 2 illustrates a section view of an unsheathed magnetized cable.
Figure 3:
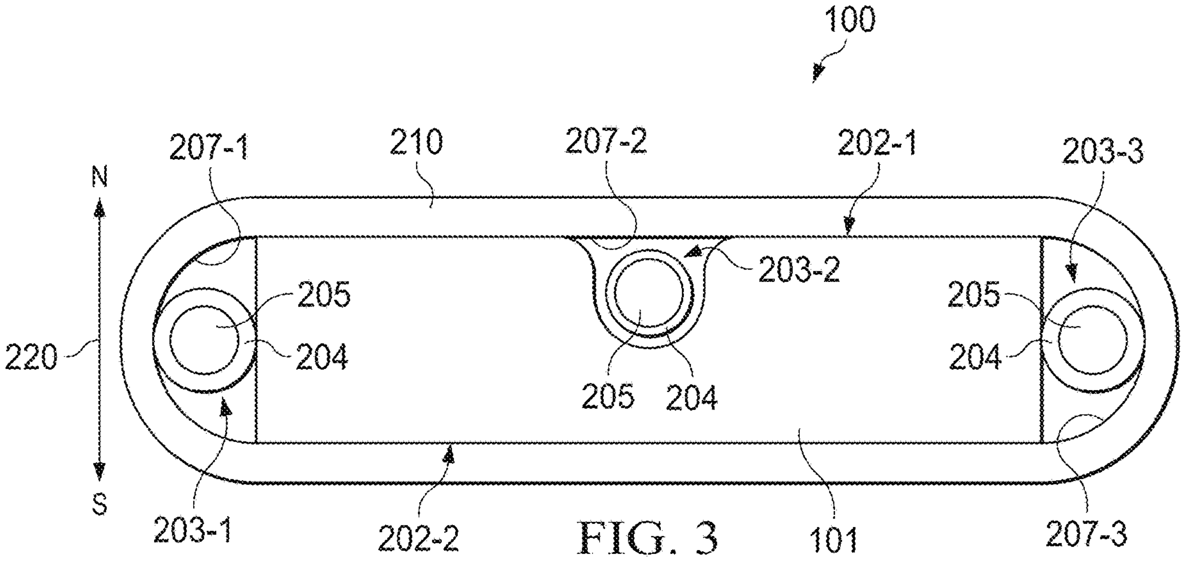
FIG. 3 illustrates a sheathed magnetized cable.

FIG. 2 and FIG. 3 illustrate cross sections for unsheathed (FIG. 2) and sheathed (FIG. 3) implementations of a magnetized cable assembly 100. The unsheathed implementation of magnetized cable assembly 100 depicted in FIG. 2 includes an EFMC 101, encompassing one or more electrically conductive wires 203. Although FIG. 2 depicts an EFMC 101 featuring three wires (203-1, 203-2, and 203-2), other implementations may employ fewer or more wires 203.

EFMC 101 may comprise any suitable combination of flexible base material and magnetized particles distributed randomly or otherwise upon or within the base material. The base material may be implemented with any of various natural or synthetic polymers exhibiting suitable flexibility. In at least some embodiments, the base material is or includes a pliable natural or synthetic rubber, silicon, silicon-rubber, or chlorinated polyethylene material exhibiting sufficient flexibility and other desirable characteristics including, without limitation, low electrical and thermal conductivity, high thermal and chemical stability, and low toxicity. The base material may be produced by any suitable manufacturing process including extrusion processes, compression molding processes, etc. The magnetized particles may comprise magnetic particles that have been subjected to a magnetic field sufficiently strong to align the magnetic orientation of the magnetic particles. The source material may be ground or otherwise processed to produce a magnetic powder that can be easily incorporated within the base material.

The EFMC 101 of the unsheathed magnetized cable assembly 100 depicted in FIG. 2 features a rectangular or substantially rectangular cross section, with optional rounded or beveled corners, defining substantially planar and parallel opposing major surfaces 202-1 and 202-2. The illustrated EFMC 101 includes three wires 203-1, 203-2, and 203-3 embedded in EFMC 101. Each wire 203 depicted in FIG. 2 includes an electrically conductive core 205 enclosed within an optional insulating coating 204. In at least one embodiment, electrically conductive cores 205 are implemented with tinned copper and insulating coating 204 is implemented with highly flexible PVC. Other embodiments may use different materials for conductive cores 205 and insulating coating 204.

The wires 203 Illustrated in FIG. 2 include two wires 203-1 and 203-3 with a larger diameter or smaller gauge and a third wire 203-2 with a smaller diameter or larger gauge. Again, however, the number of wires 203 included in EFMC 101 and the diameters of each wire 203 are design choices that may vary from one implementation to the next. Wires 203 may be incorporated within EFMC 101 while EFMC 101 is being formed. For example, magnetized cable may be fabricated by an extrusion process in which one or more wires 203 are fed through an extrusion tool as the EFMC compound is extruded around them. Other embodiments may incorporate wires 203 within the EFMC compound after EFMC 101 is formed.

FIG. 2 further illustrates a magnetic field indicator 220 to convey an orientation of a persistent magnetic field produced by EFMC 101. The magnetic field indicator 220 of FIG. 2 indicates that first major surface 202-1 constitutes or lies within a region having a north polarity of the persistent magnetic field while second major surface 202-2 constitutes or lies within a region having a southern polarity region of the persistent magnetic field. In the depicted configuration, it will readily appreciated that, when EFMC 101 as coiled upon itself, whether for storage or otherwise, portions of first major surface 202-1 within one loop of the coiled cable will come into close proximity with portions of second major surface 202-2 in the next adjacent loop of the coiled cable and that the persistent magnetic field will provide a magnetic force of attraction between the opposing major surfaces that actively assists in the coiling process as the cable magnetically "snaps" onto itself. In at least some embodiments, a strength of the persistent magnetic field will be sufficient to maintain the opposing major surfaces of EFMC 101 in contact with one another after the person or device coiling the cable releases the cable.

Some embodiments implement a Halbach array configuration in which the polarity of the magnetic field alternates, e.g., N-S-N-S, to increase the magnetic flux on one side of a magnetic assembly.

The magnetized cable assembly 100 depicted in FIG. 3, like the magnetized cable assembly 100 EFMC 101 depicted in FIG. 2, includes an EFMC 101 and a set of three wires 203-1, 203-2, and 203-3. Unlike the EFMC 101 of FIG. 2, however, the EFMC 101 of FIG. 3 includes a sheath 210 surrounding and enclosing EFMC 101 and wires 203. In addition, whereas the wires 203 depicted in FIG. 2 are embedded within EFMC 101, the wires 203 depicted in FIG. 3 are not embedded within EFMC 101. Instead, the wires 203 of FIG. 3 are positioned within voids 207-1, 207-2, and 207-3 defined between EFMC 101 and the surrounding sheath 210. The EFMC 101 of FIG. 3 occupies a substantial majority of the cavity defined by the interior of sheath 210 and the voids 207 are not so large as to leave appreciable distance between sidewalls of wires 203 and sheath 210 or EFMC 101. Instead, the voids 207 depicted in FIG. 3 are sized to retain wires 203 in close proximity to adjacent portions of sheath 210 and EFMC 101. In at least one embodiment, sheath 210 is comprised of a braided fabric nylon, but other suitable materials may be used. In at least one additional embodiment, sheath 210 is comprised of an extruded polymer.

Like the unsheathed EFMC 101 of FIG. 2, the sheathed EFMC 101 depicted in FIG. 3 produces a persistent magnetic field represented by magnetic field indicator 220. The EFMC 101 of the magnetized cable assembly 100 illustrated in FIG. 3 has an oval cross section that defines substantially planar and parallel first and second major surfaces 202-1 and 202-2. As indicated by the magnetic field indicator 220, the first major surface 202-1 has a north polarity while second major surface 202 has a south polarity of the persistent magnetic field. This configuration again, as it did with the configuration illustrated in FIG. 2, facilitates efficient handling and storage of EFMC 101 by providing a magnetic field that actively assists in the coiling process and, after the cable is coiled, maintaining EFMC 101 in the coiled position. Because wires 203 are not embedded in within the EFMC compound, the EFMC compound can be extruded or otherwise fabricated independently of wires 203.

Figure 4:
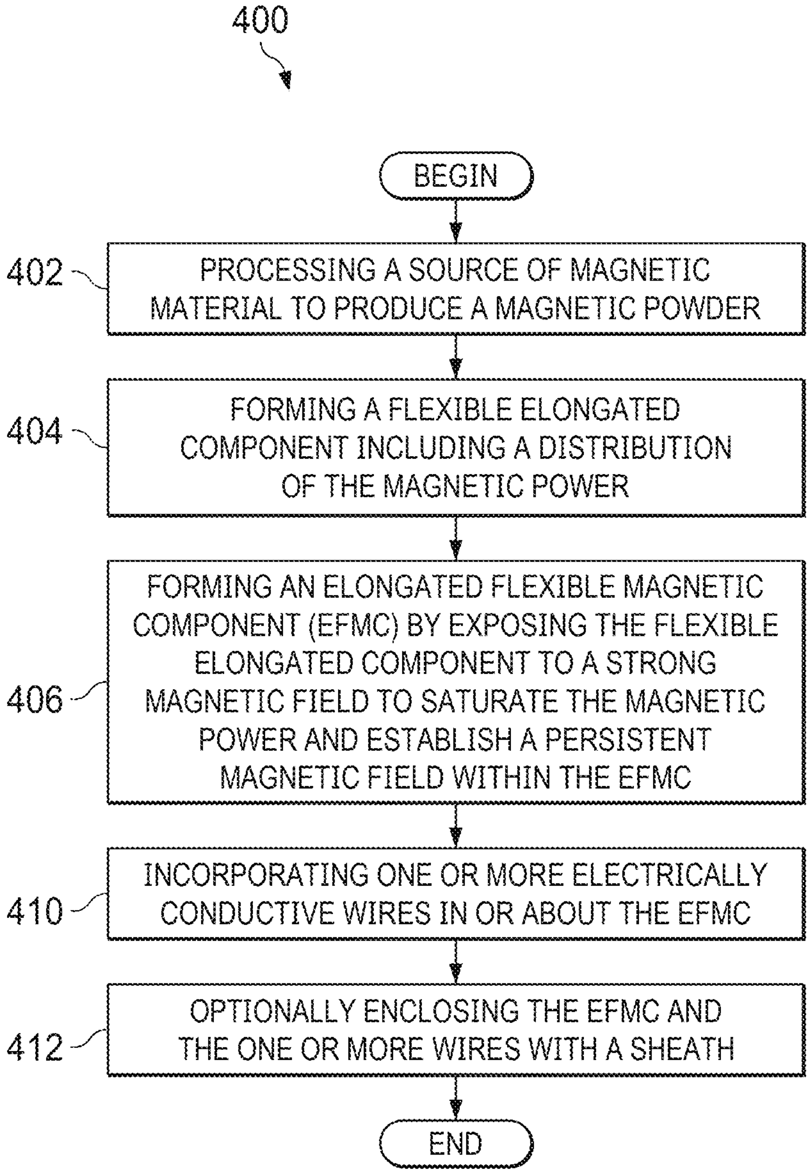
FIG. 4 illustrates a flow diagram of a method for fabricating magnetized cables.

Referring now to FIG. 4, a flow diagram illustrates an exemplary method 400 of producing a sheathed magnetic assembly including an EFMC 101. While the flow diagram implies an order or sequence of the depicted operations, the diagram is not intended to be so limiting and, unless an order of two or more operations is expressly disclosed, operations of method 400 may occur in a different sequence where appropriate.

The illustrated method 400 includes grinding and/or otherwise processing (operation 402) a source of magnetic material to produce a magnetic powder containing magnetic particles. The source of the magnetic material may include scrap, recycled, waste, or otherwise previously used magnetic material. Method 400 may further include forming (operation 404) a flexible elongated compound including a distribution of the magnetic powder. The EFMC may then be formed by exposing (operation 406) the flexible elongated component to a strong magnetic field to saturate the magnetic powder and establish the persistent magnetic field within of the EFMC. One or more electrically conductive wires may then be incorporated (operation 410) in or about the EFMC and, optionally, enclosing (operation 412) the EFMC and the electrically conductive wires within a sheath.

Figure 5:
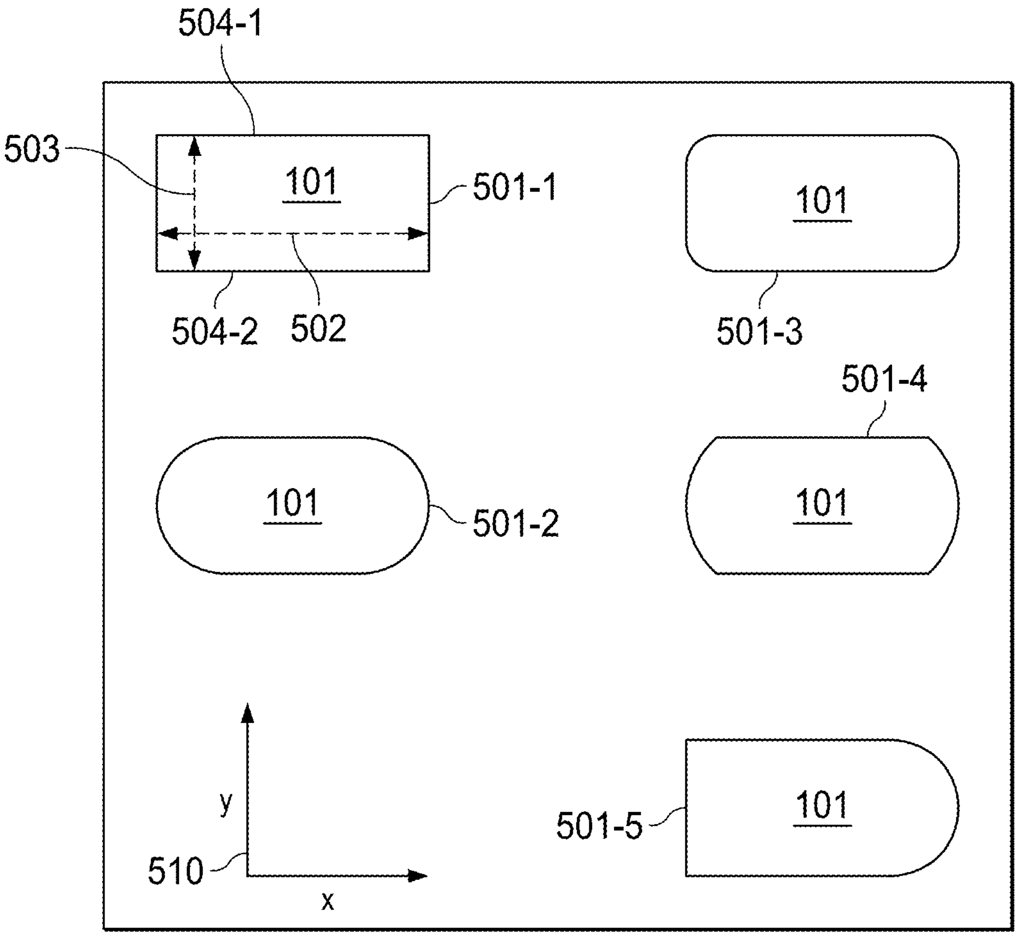
FIG. 5 depicts various cross section options for magnetized cables.

Cross Sectional Shape. FIG. 5 illustrates representative and non-exhaustive cross sections 501-1 through 501-5 along for various implementations of EFMC 101 along with reference x-y axes 510 for orientation. Each cross section 501 illustrated in FIG. 5 is symmetric or substantially symmetric about both the x-axis and the y-axis. In addition, an x-axis or horizontal dimension 502 of each cross section 501 depicted in FIG. 5 is greater than a y-axis or vertical dimension 503. Each cross section 501 depicted in FIG. 5 has a pair of substantially planar and parallel major surfaces including a first major surface 504-1 and a second major surface 504-2. As oriented in FIG. 5, first major surface 504-1 may be referred to as the upper major surface while second major surface 504-2 may be referred to as the lower surface. In at least some embodiments, first major surface 504-1 lies within a first polarity region of a persistent magnetic field (not depicted in FIG. 5) while second major surface 504-2 lies in within a second polarity region of the persistent magnetic field.

Figure 6A:
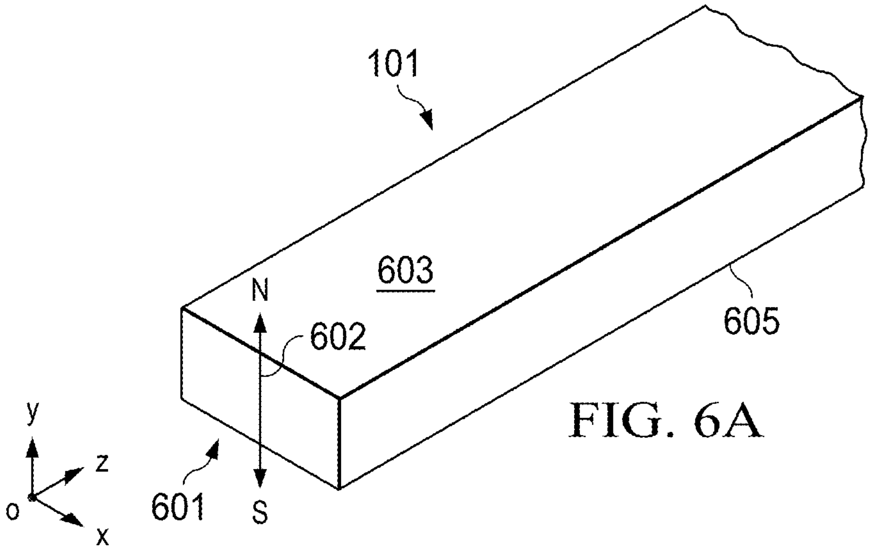
FIGS. 6A and 6B depict magnetic profile operations.
Figure 6B:
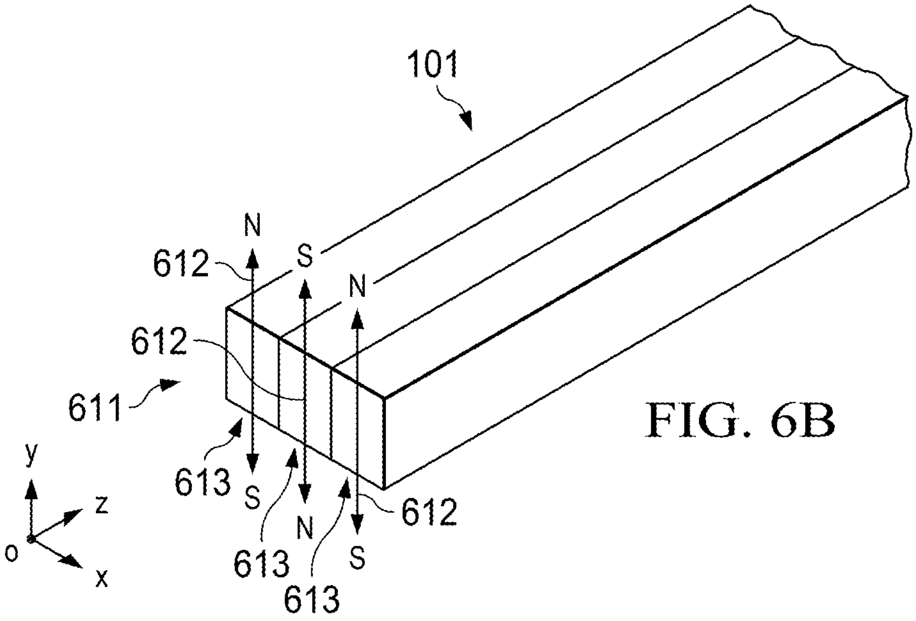

Magnetic field orientation. FIGS. 6A and 6B illustrate representative EFMC magnetic field profiles including a first EFMC magnetic field profile 601 (FIG. 6A) in which a north pole of the persistent magnetic field 602 of EFMC 101 corresponds to an upper surface 603 of EFMC 101 and a south pole of the magnetic field 602 corresponds to a lower surface 605 of EFMC 101.

Figure 7A:
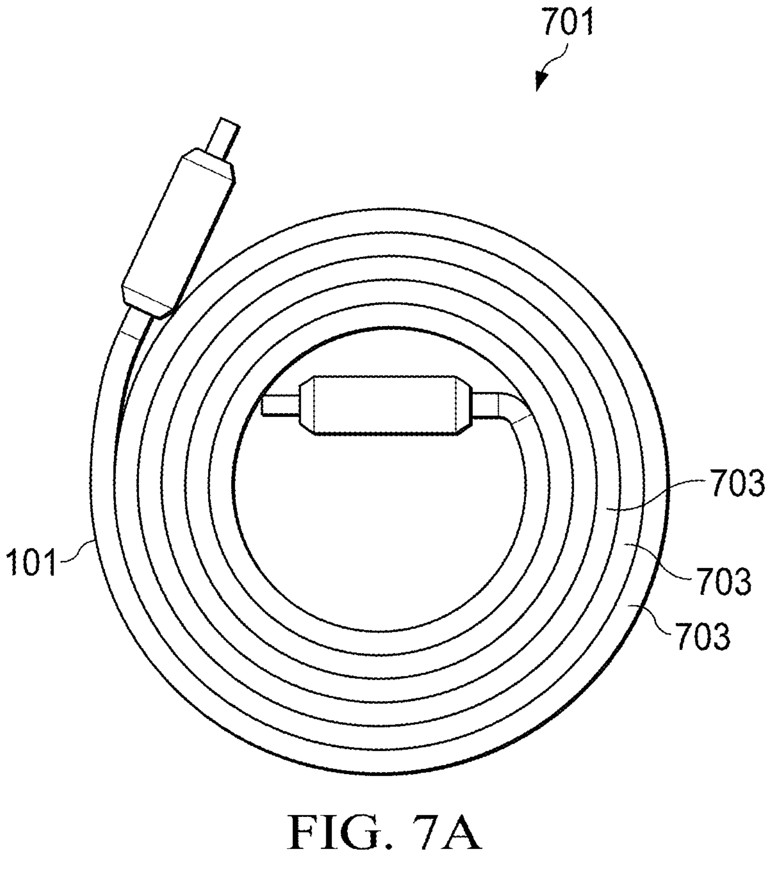
FIGS. 7A, 7B, and 7C depict a spiral form factor EFMC.
Figure 7B:
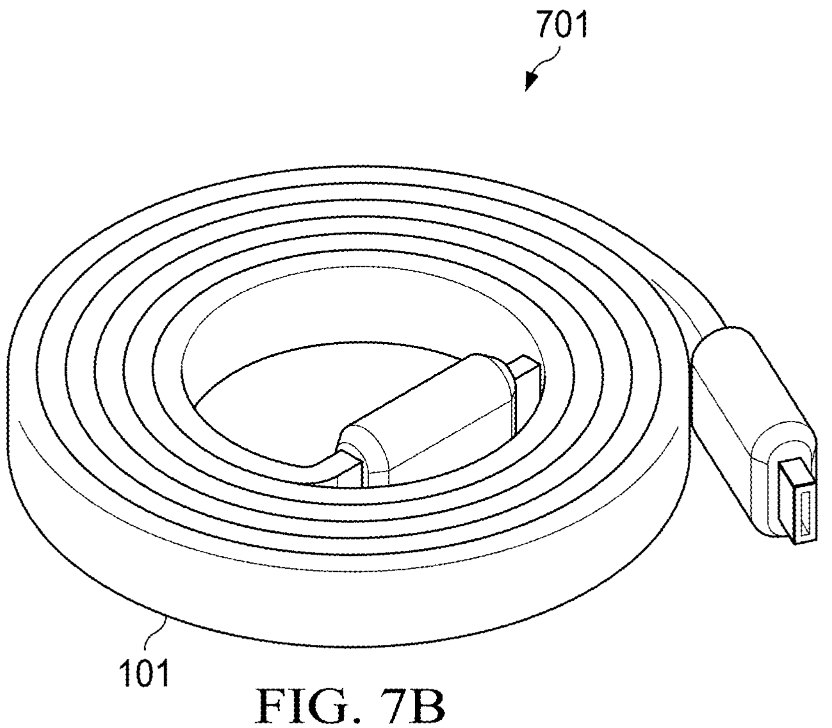
Figure 7C:
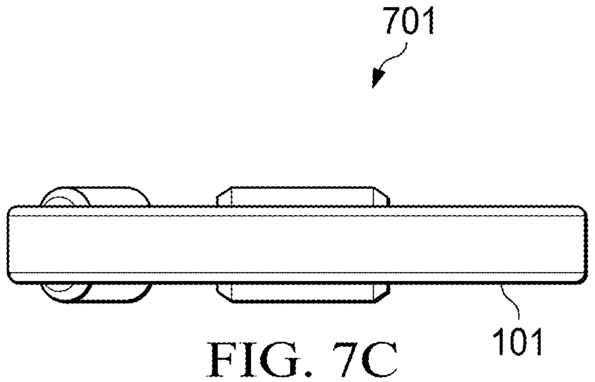

FIG. 6B depicts a second magnetic field profile 611 comprising a plurality of magnetic fields 612 corresponding to a plurality of EFMC sections 613 wherein the polarities of the magnetic fields 612 in any two adjacent sections 613 of EFMC 101 are opposing, i.e., oriented at 180 degrees with respect to one another. The depicted magnetic field profile 611 may be descried as an NSN profile to convey three magnetic three field of with alternating polarities along the upper surface. Although FIG. 6B depicts three distinct magnetic fields 612 corresponding to three EFMC sections 613, the number of sections 613 is an implementation detail and other implementations (not depicted) may include more or fewer section 613. Representative examples of magnetic field profiles would include NS, NSNS, NSNSN, etc. Further, although FIG. 6B depicts distinct magnetic fields 612 alternating in polarity along the x-axis, the magnetic fields could instead alternate along the z-axis or any other axis Spiral form factor. FIGS. 7A, 7B, and 7C illustrate, respectively, top plan, perspective, and elevation views of EFMC 101 in a coiled state suitable for storage, packaging, etc. Because the coiled state of the depicted EFMC 101 is spiraled, the depicted EFMC 101 may be described has having a spiral form factor 701. The spiral form factor 701 depicted in FIGS. 7A, 7B, and 7C facilitates coiling of magnetized cable 100 into a spiral coiled configuration, which is highly suitable for storing EFMC 101 when not in use. In the spiral form factor 701 as shown, EFMC 101 includes multiple co-coplanar and concentric loops 703 in which the north pole major surface, see, e.g., FIGS. 2 and 3, of each loop 703 is magnetically attracted to the south pole surface of the next adjacent loop.

Figure 8:
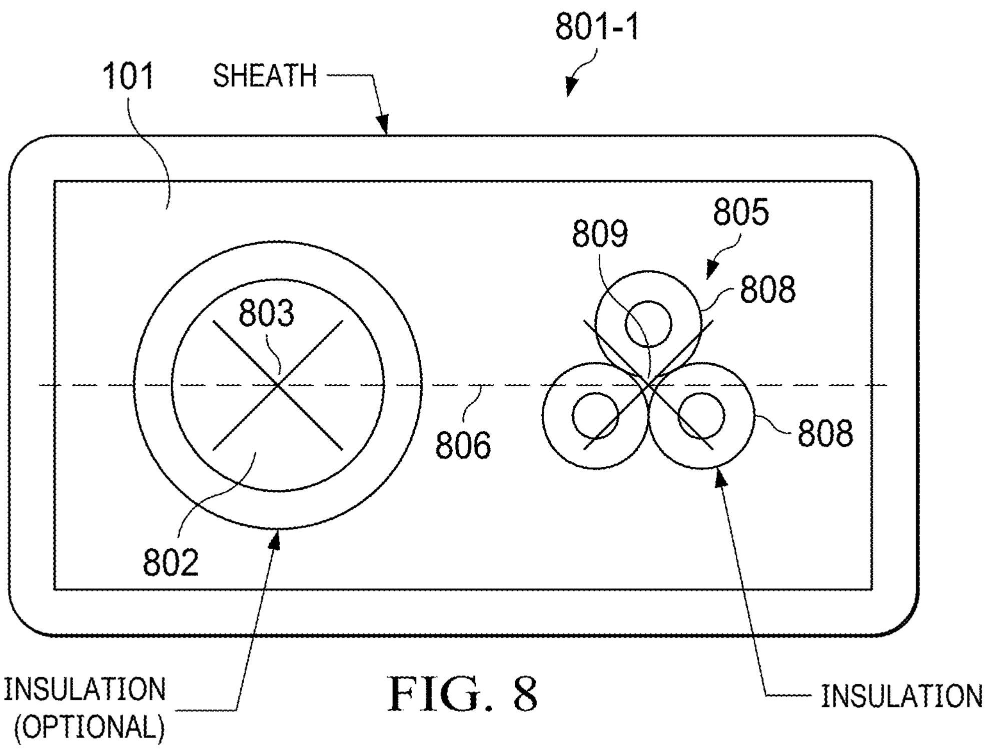
FIGS. 8-13 depict representative wire configuration operations for the spiral form factor magnetized cable.

FIGS. 8-12 depict cross sections of representative EFMCs 101 and wire configurations 801 suitable for use with spiral form factor EFMCs such as the spiral form factor EFMC 701 depicted in FIGS. 7A, 7B, and 7C. The wire configuration 801-1 depicted in FIG. 8 includes one or more individual stranded or solid wires 802, one of which is shown in FIG. 8, wherein a central axis 803 of wire 802 is vertically aligned with a central plane 809 of EFMC 101. Optionally or alternatively, wire configuration 801-1 may include one or more twisted bundles 805, each of which includes two or more insulated wires 808 and wherein the central axis 809 of twisted bundle 805 is vertically aligned with central plane 806 of EFMC 101.

The spiral form factor EFMC 101 depicted in FIG. 8 may be produced with manufacturing operations including, in at least one representative process, compounding a polymer and magnetic particles to form a flexible elongated component, wire extruding stranded wire(s) 802 and/or twisted bundles 805 over the flexible elongated component and magnetizing the flexible elongated component to form the EFMC. In at least some embodiments, a braided textile, painted, or extruded polymer sheath is formed or otherwise applied around the EFMC, which may then be cut to a desired length before installing connectors at each end. In at least some embodiments, magnetization of the EFMC may be performed after the cutting operation. In either scenario, magnetization may be achieved by applying a strong magnetic field (e.g., greater than 5 T magnetic flux density) to align all or substantially all of the magnetic particles to magnetize the EFMC.

Figure 9:
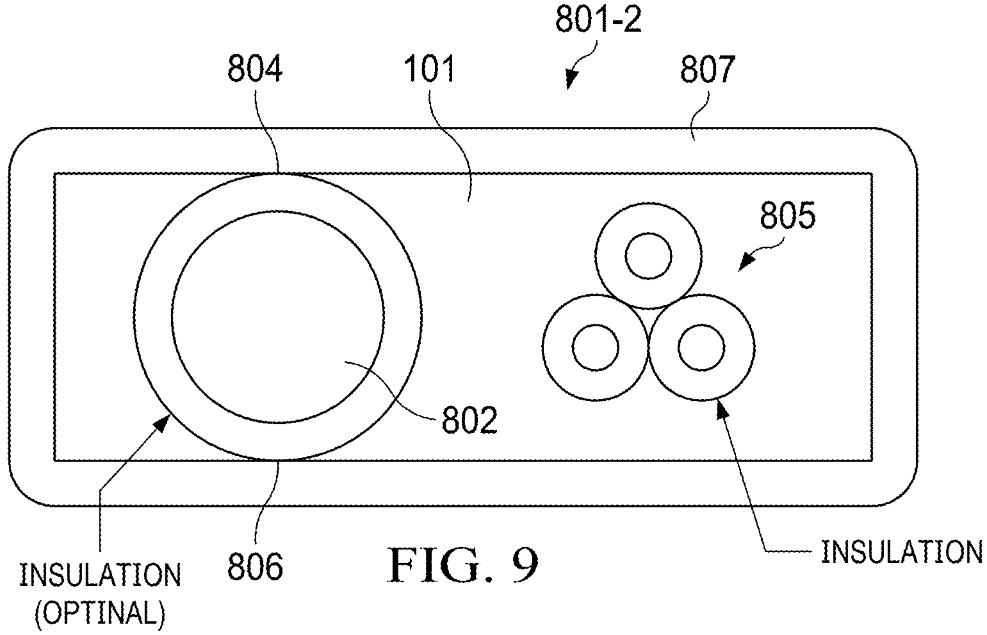

Referring now to FIG. 9, a second wire configuration 801-2 for the spiral form factor EFMC 101 of FIGS. 7A, 7B, and 7C is shown. The second wire configuration 801-2 depicted in FIG. 9 is a lower profile version of first wire configuration 801-1. Portions of the EFMC 101 depicted in FIG. 9 have been removed to achieve a low profile EFMC. Specifically, portions of EFMC 101 located above an upper edge 804 of stranded wire 802, including any insulation surrounding stranded wire 802, and portions of EFMC 101 located below a lower edge 806 of stranded wire 802, including any surrounding insulation, have been removed such that a perimeter of stranded wire 802, including any optional insulation surrounding stranded wire 802, is in close proximity to or in contact with sheath 807 at upper and lower edges 804 and 806 respectively.

The thinner profile of the low profile EFMC 101 shown in FIG. 9 may result in increased fragility since little if any EFMC 101 resides above or below the embedded wire or the twisted bundle. To address this issue, methods of manufacturing low profile EFMC are disclosed in reference to FIG. 10 and FIG. 11.

Figure 10:
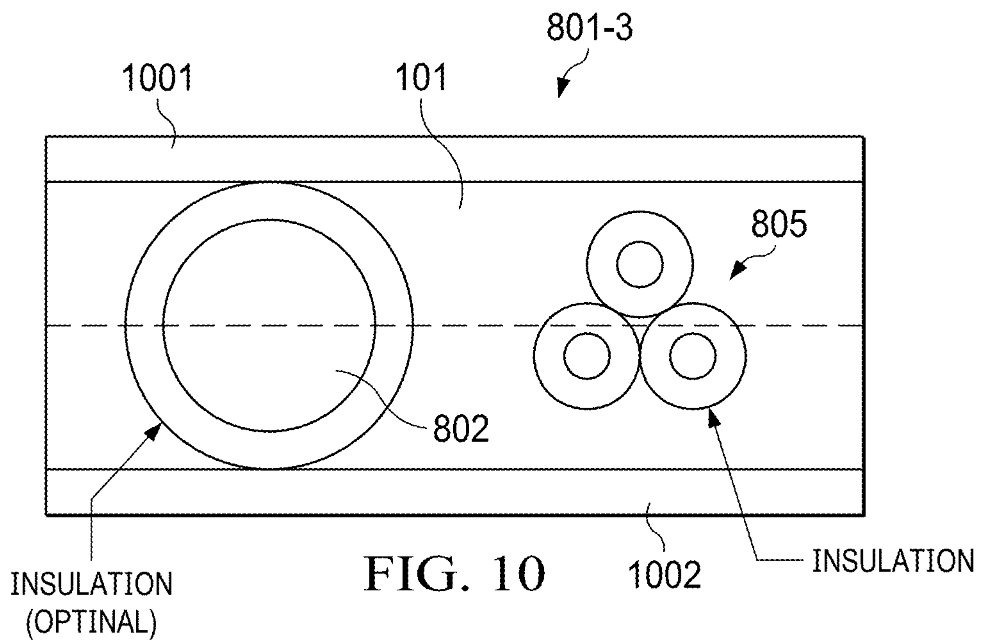

Referring to FIG. 10, low profile EFMC 801-3 may be produced by compounding magnetic particles to form an elongated flexible component before wire extruding the flexible elongated component over the wires, including extra material above (1001) and below (1002) stranded wire 802 any optional insulation. The extra material 1001, 1002, may be trimmed before a braided textile or extruded polymer sheath may be brayed around the EFMC and wires. The EFMC may then be cut to the desired length, before installing connectors at each end. A strong magnetic field (preferably greater than 5 T) may then be generated to magnetize the EFMC.

Figure 11:
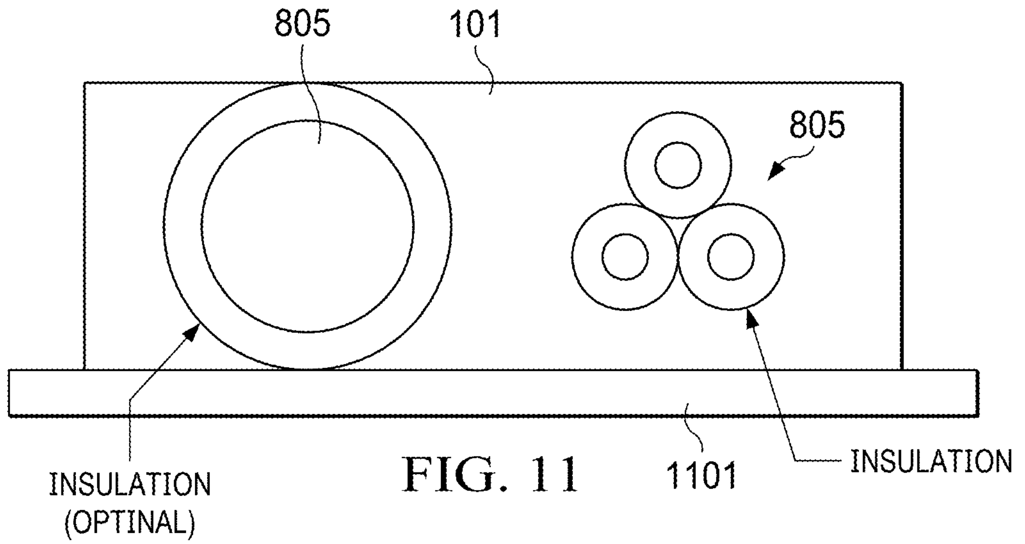

Referring now to FIG. 11, a second method for manufacturing a low profile EFMC may include, once again, compounding a polymer and magnetic particles to produce a flexible elongated component. A carrier tape 1101 may then be thread through the wire extruder along with the wires to support the assembly as the flexible elongated component is extruded. After extrusion is complete, the carrier tape may be separated from the assembly before a braided textile or extruded polymer sheath is applied around the EFMC and wires. The EFMC may then be cut to the desired length and installing connectors at each end before applying a strong magnetic field (preferably greater than S T) to magnetize the EFMC.

Figure 12:
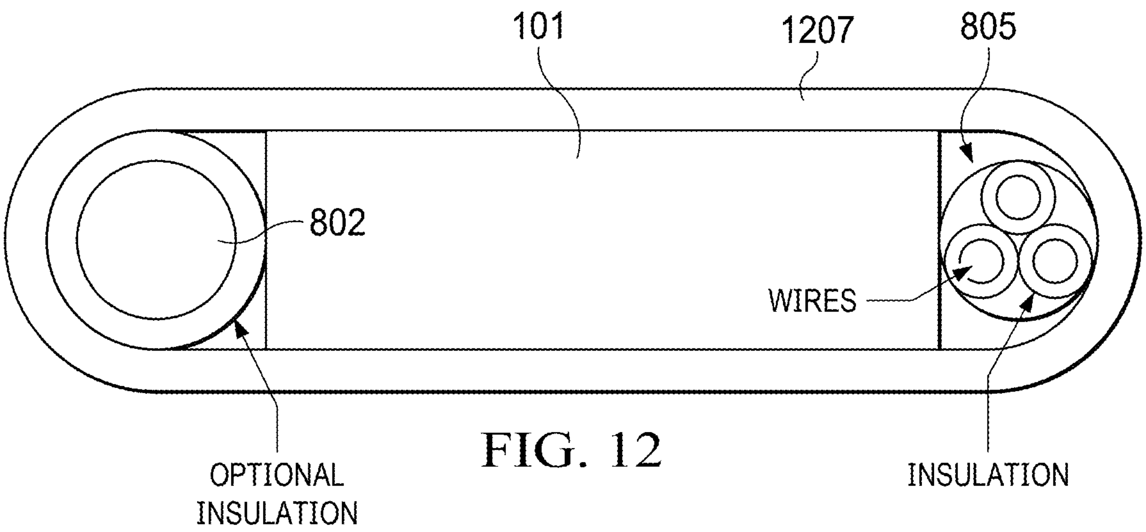

Referring now to FIG. 12, the illustrated EFMC 101 includes no embedded stranded wires or wire bundles embedded within the EFMC 101. Instead, one or more stranded wires 802 is routed alongside the EFMC. Alternatively, or in addition, one or more twisted bundles 805 of two or more insulated wires may be routed alongside EFMC 101. In both of these embodiments, a sheath 1207 surrounds the EFMC and the adjacent stranded wire 802 and twisted bundle 805.

The EFMC 101 depicted in FIG. 12 may be formed by compounding a polymer and magnetic particles and extruding the flexible elongated component. One or more stranded wires and one or more wire bundles may then be routed alongside the flexible elongated component. A braided textile or extruded polymer sheath may then be formed surrounding the flexible elongated component, the stranded wires and twisted bundles. The flexible elongated component may then be to the desired length and connectors may be installed at each end before applying a strong magnetic field (preferably greater than 5 T) to magnetize the flexible elongated component and thereby form the EFMC. In other embodiments, the magnetization of the flexible elongated component may occur at an earlier stage in the process.

Figure 13:
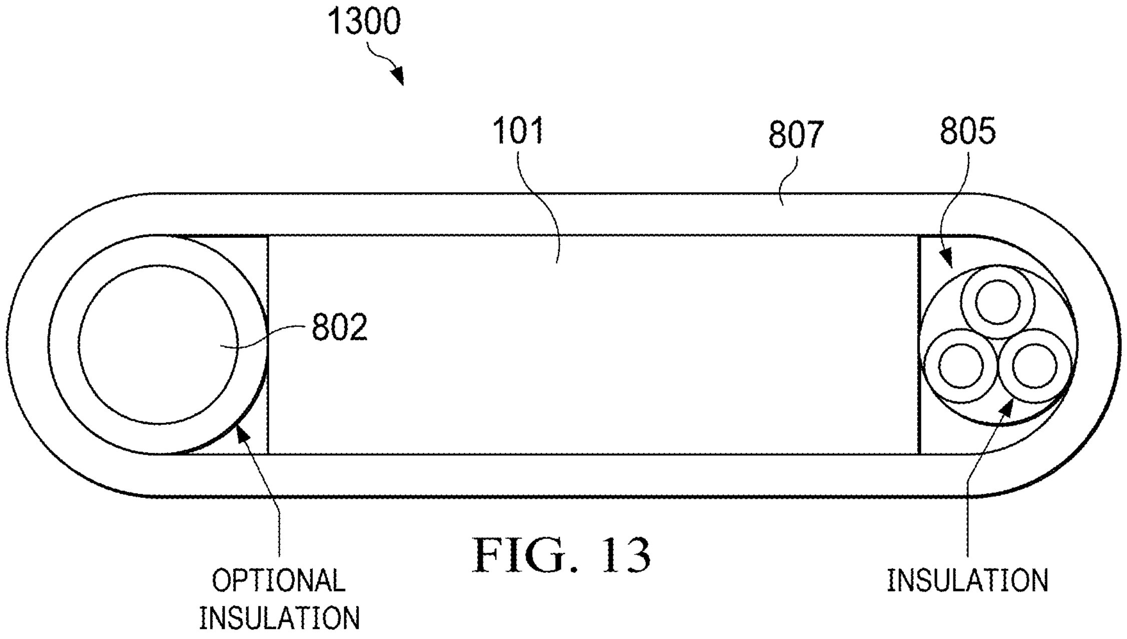

Referring now to FIG. 13, the illustrated EFMC 101 may combine one or more features of EFMCs depicted in FIGS. 8-12. The EFMC 101 of FIG. 13 may comprise an EFMC 101 as depicted in FIG. 8 including one or more embedded stranded wires and/or one or more twisted bundles (not shown in FIG. 13). The EFMC 101 of FIG. 13 may further include features disclosed in FIG. 12 with one or more stranded wires 802 and/or one or more twisted bundles 805 routed adjacent to an outer wall of EFMC 101 and bound in place adjacent to said outer wall by a sheath 807.

Figure 14A:
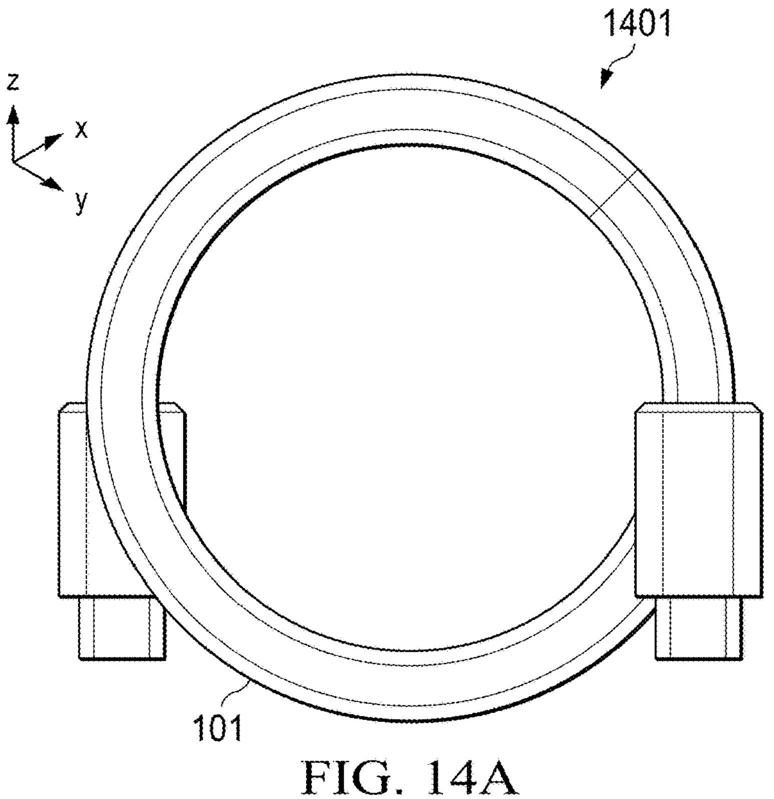
FIGS. 14A, 14B, and 14C depict a helical form factor EFMC.
Figure 14B:
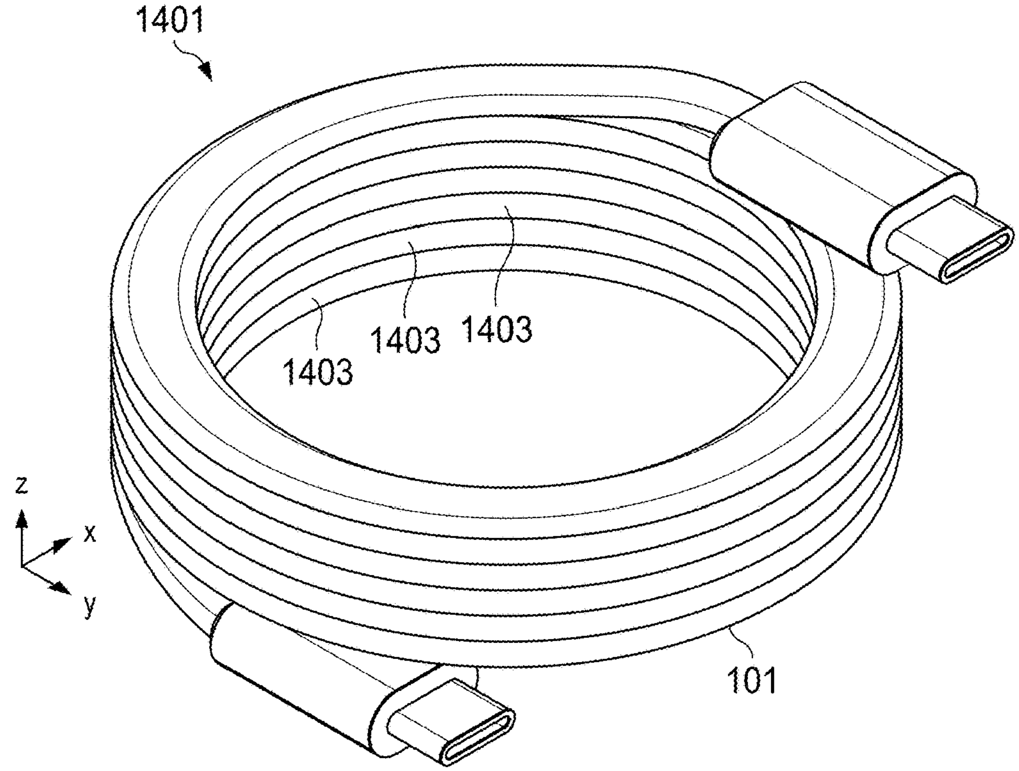
Figure 14C:
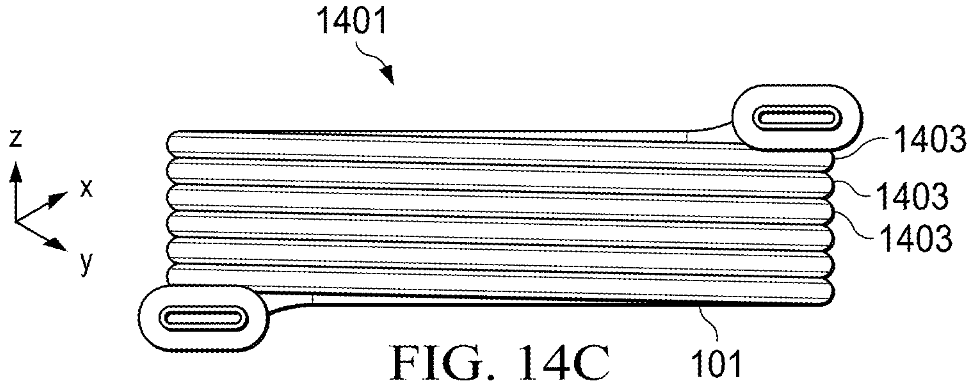
Figure 15:
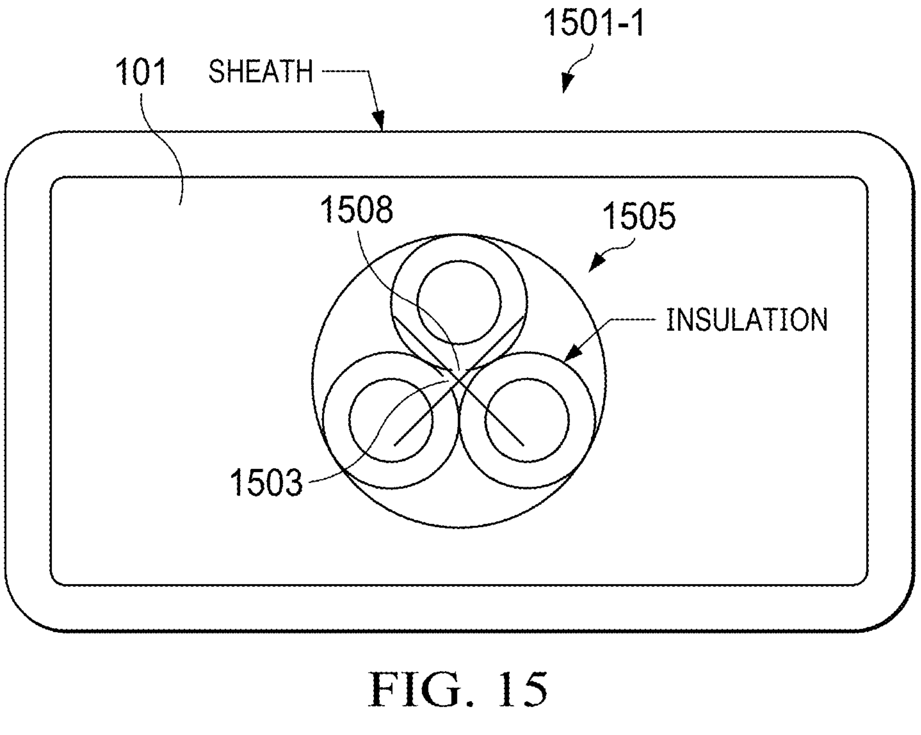
FIGS. 15-22 depict wire configurations for helical form factors.

Helical form factor. FIGS. 14A, 14B, and 14C illustrate, respectively, top plan, perspective, and elevation views of magnetized cable EFMC 101 implemented with a helical form factor 1401 that facilitates coiling into a helical configuration suitable for storing and/or displaying EFMC 101 when not in use. The helical form factor 1401 includes a plurality of concentric loops 1403 wound around a theoretical right cylinder at an oblique angle such that a z-dimension of the coiled EFMC 101 increases as a length of the EFMC increases, analogous to a "slinky" toy configuration. In the helical configuration 1401 as shown, EFMC 101 includes multiple concentric loops 1403 in which a north pole surface of each loop 1403 is magnetically attracted to the south pole surface of the next adjacent loop.

FIGS. 15-22 depict cross sections of representative EFMCs 101 and wire configurations suitable for use with helical form factor EFMCs such as the helical form factor magnetized cable 1401 depicted in FIG. 14. The wire configuration 1501-1 depicted in FIG. 15 includes a twisted bundle 1505 of two or more insulated wires embedded in EFMC 101. In at least some embodiments, a central axis 1503 of twisted bundle 1505 is aligned with a central axis 1508 of EFMC 101. Alternatively, wire configuration 1501-1 may include a single wire (not depicted) instead of the twisted bundle 1505 of FIG. 15.

The helical form factor magnetized cable 1401 depicted in FIG. 14 may be produced with manufacturing operations including, in at least one representative process, compounding a polymer and magnetic particles to form a flexible elongated component, wire extruding a stranded wire or a twisted bundle over the flexible elongated component. In at least some embodiments, a braided textile, painted, or extruded polymer sheath is formed or otherwise applied around the flexible elongated component, which may then be cut to a desired length before installing connectors at each end. The flexible elongated component may then be magnetized by applying a strong magnetic field (e.g., greater than 5 T magnetic flux density) to magnetize the flexible elongated component and thereby form the EFMC with a persistent magnetic field. The EFMC may then be placed or positioned in a helical configuration before performing a heat treatment operation to permanently impart the helical shape to the EFMC.

Figure 16:
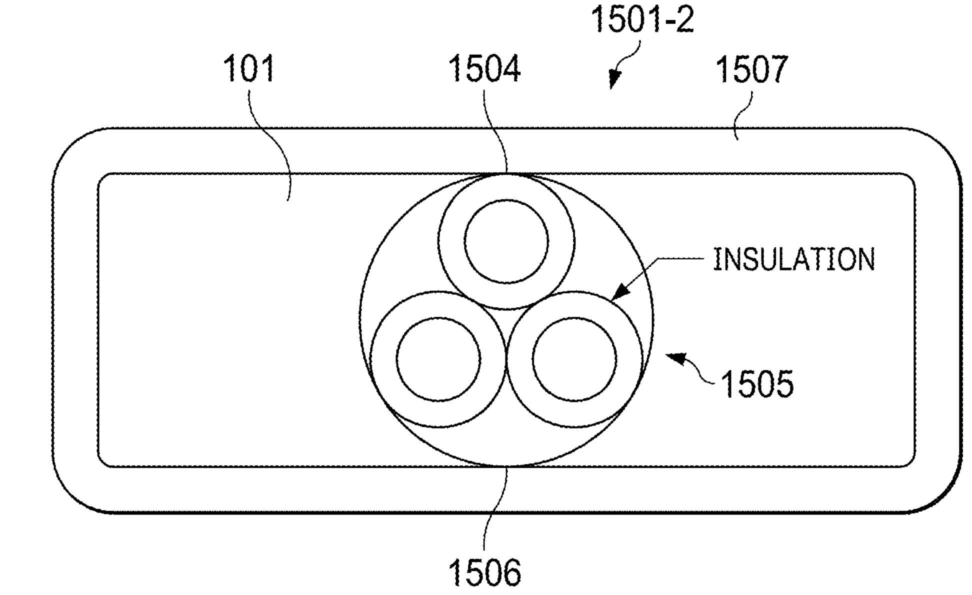

Referring now to FIG. 16, an alternative wire configuration 1501-2 for the helical form factor magnetized cable 1401 of FIG. 14 is shown. The second wire configuration 1501-2 depicted in FIG. 16 is a lower profile version of first wire configuration 1501-1. As depicted in FIG. 16, portions of the EFMC 101 depicted in FIG. 15 have been removed to reduce a cross-sectional surface area of the resulting magnetized cable. Specifically, portions of EFMC 101 lying above an upper edge 1504 of twisted bundle 1505 including any insulation surrounding the stranded wires within twisted bundle 1505 and/or a portion below a lower edge 1506 of twisted bundle 1505, have been removed such that a perimeter of twisted bundle 1505, including any optional insulation surrounding the stranded wires within twisted bundle 1505, is in close proximity to or in contact with sheath 1507 at upper and lower positions 1504 and 1506 as shown.

Figure 17:
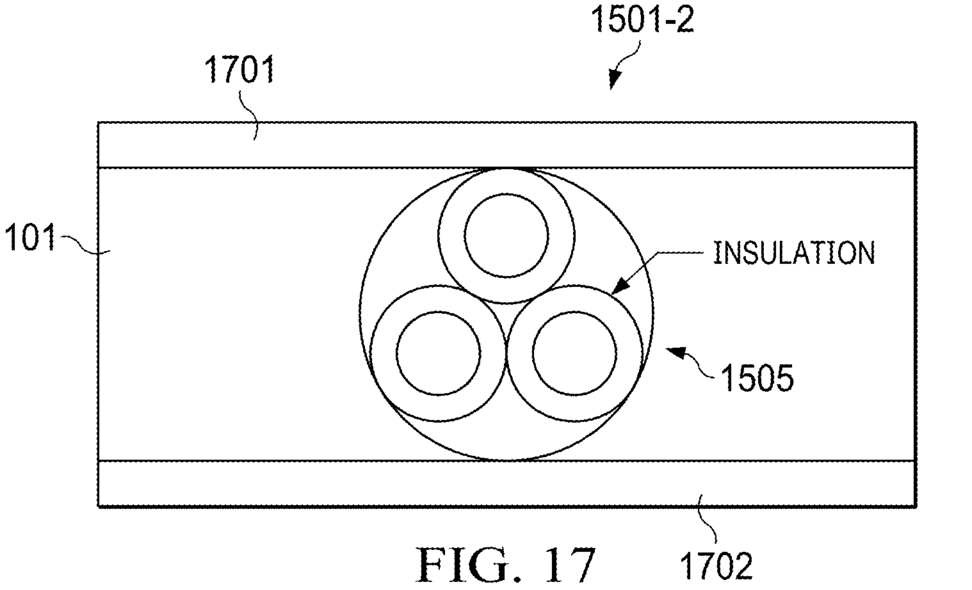

Referring to FIG. 17, low profile wire configuration 1501-2 may be produced by compounding magnetic particles to form a flexible elongated component before wire extruding the EFMC precursor over the wires, including extra material above (1701) and below (1702) twisted bundle 1505. The extra material 1701, 1702, may be trimmed before a braided textile or extruded polymer sheath may be applied around the flexible elongated component. The flexible elongated component may then be cut to a desired length, before installing connectors at each end. A strong magnetic field (preferably greater than 5 T) may then be generated to magnetize flexible elongated component and thereby create the EFMC 101. EFMC 101 may then be positioned in a helical coil and subjected to a heat treatment to permanently impart the helical shape to EFMC 101.

Figure 18:
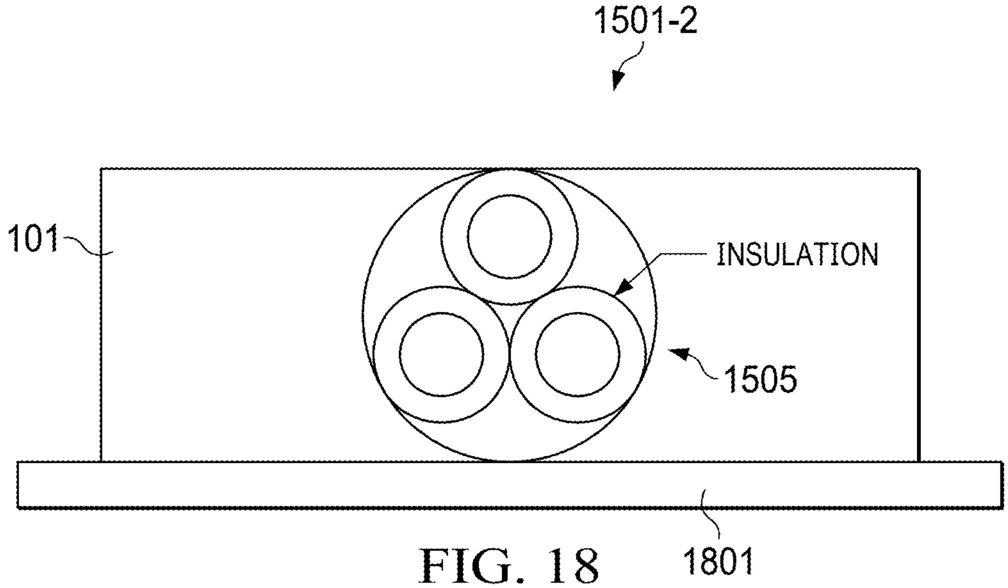

Referring now to FIG. 18, a second method for manufacturing wire configuration 1501-2 for a low profile EFMC 101 may include, once again, compounding a polymer and magnetic particles to produce a flexible elongated component, feeding a carrier tape 1801 through the wire extruder along with the wires to support the assembly as the flexible elongated component is extruded. After extrusion is complete, the carrier tape 1801 may be separated from the assembly before a braided textile or extruded polymer sheath is applied around the flexible elongated component and wires. The flexible elongated component may then be cut to the desired length and connectors installed at each end before applying a strong magnetic field (preferably greater than S T) to magnetize the flexible elongated component and form the EFMC 101. The magnetized EFMC may then be placed in a helical position and subjected to a heat treatment to permanently impart the helical shape to the EFMC.

Figure 19:
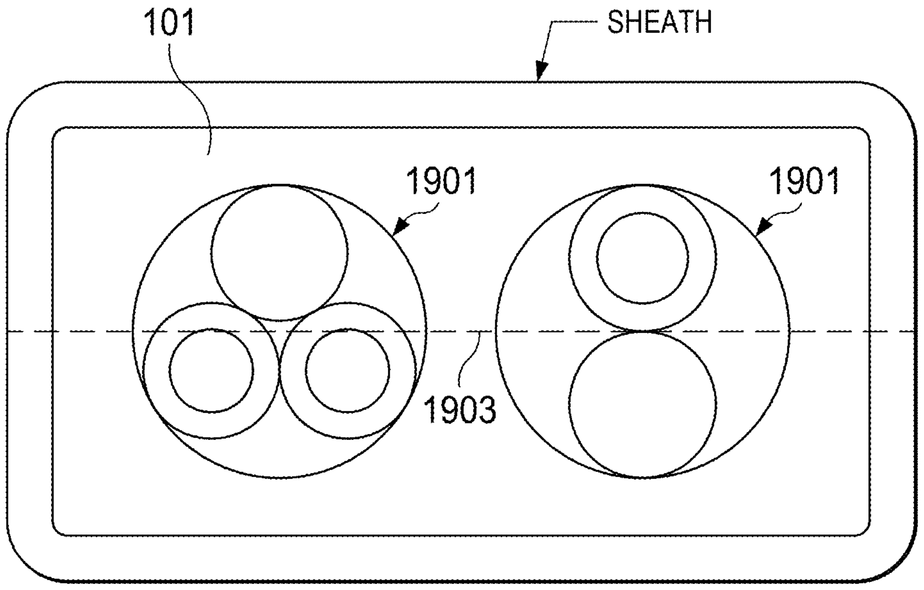

Referring now to FIG. 19, one or more stretchable wires 1901, as disclosed in more detail below, are embedded in EFMC 101. In at least some embodiments, a central axis of each stretchable wire 1901 is vertically aligned with a central plane 1903 of EFMC 101. The stretchable wire(s) 1901 may, in at least some embodiments, withstand compression or tension present outside of the central axis of the EFMC.

The EFMC 101 depicted in FIG. 19 may be formed by compounding a polymer and magnetic particles and extruding the flexible elongated component. One or more stranded wires and one or more wire bundles may then be routed alongside the flexible elongated component. A braided textile or extruded polymer sheath may then be formed surrounding the flexible elongated component, the stranded wires and twisted bundles. The flexible elongated component may then be to the desired length and connectors may be installed at each end before applying a strong magnetic field (preferably greater than 5 T) to magnetize the flexible elongated component and thereby create the EFMC 101. EFMC 101 may then be positioned in a helical configuration or coil and heat treated to impart the helical shape to the EFMC.

Figure 20:
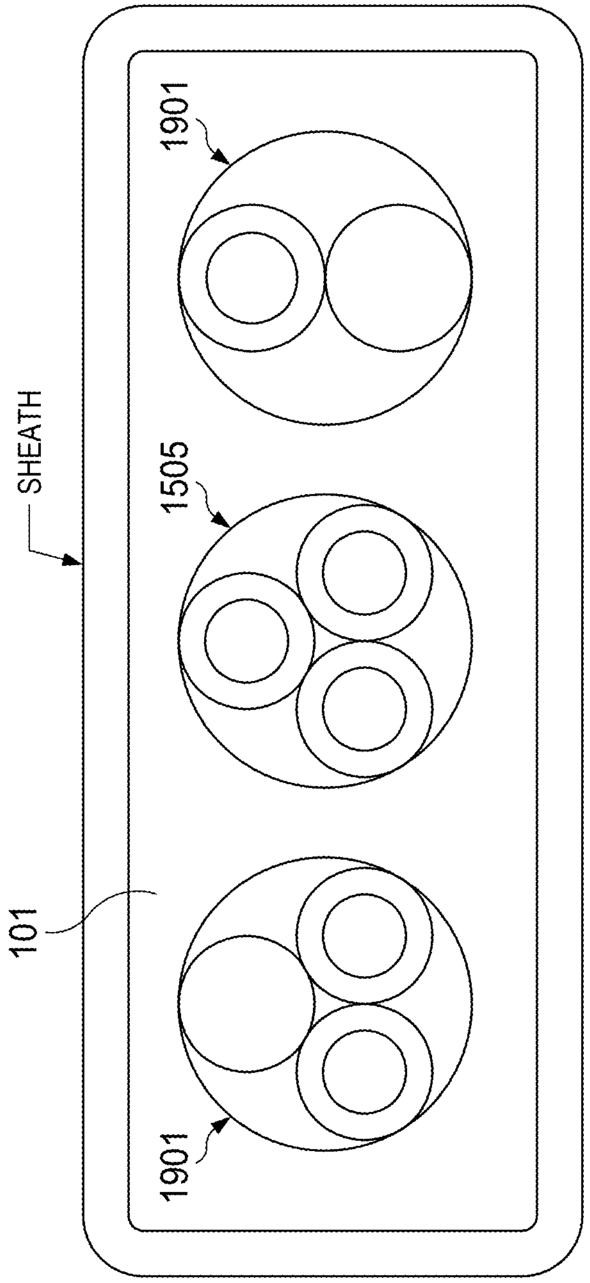

Referring now to FIG. 20, the illustrated EFMC 101 may combine one or more features of EFMCs depicted in FIGS. 15-19. The depicted EFMC combines a twisted bundle 1505 in combination with one or more stretchable wires 1901.

Figure 21:
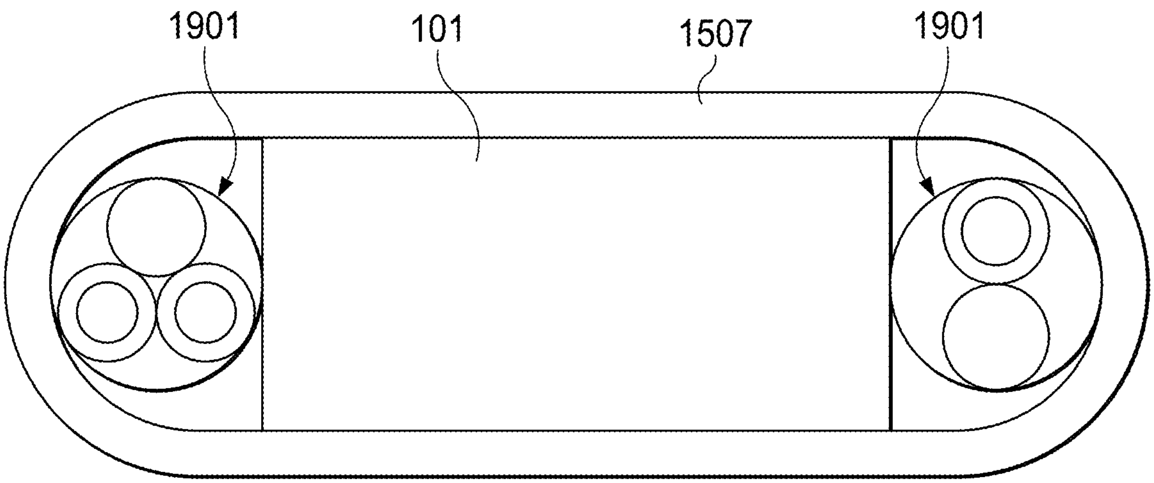

Referring now to FIG. 21, the illustrated EFMC 101 includes no stranded wires or wire bundles embedded within the EFMC 101. Instead, one or more stranded wires 1901 is routed alongside EFMC 101. Alternatively, or in addition, one or more twisted bundles of two or more insulated wires may be routed alongside EFMC 101. In both of these embodiments, a sheath 1507 encloses EFMC 101 and the adjacent stretchable wires 1901.

Figure 22:
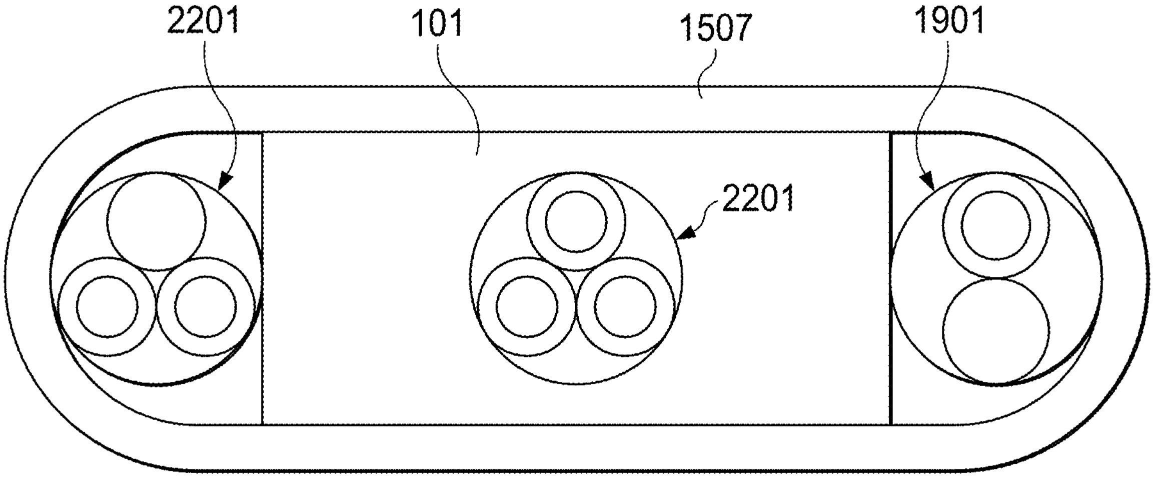

Referring now to FIG. 22, the illustrated EFMC 101 includes a combination of stranded wires or twisted bundles 2201 embedded within the EFMC 101 and, one or more stranded wires 1901 routed external to but alongside EFMC 101. In both of these embodiments, a sheath 1507 encloses EFMC 101 and the adjacent stretchable wires 1901.

Stretchable Wires. Turning now to FIGS. 23 and 24 additional disclosure regarding stretchable wires 1901 is presented. For the purposes of this application, a stretchable wire includes a wire arranged in a helix or a sine wave pattern. Stretchable wires are suitable for the previously described helical form factor 1501 at least in part because stretchable wires may be able to compensate for compression or tension present outside of the EFMC central axis.

Figure 23A:
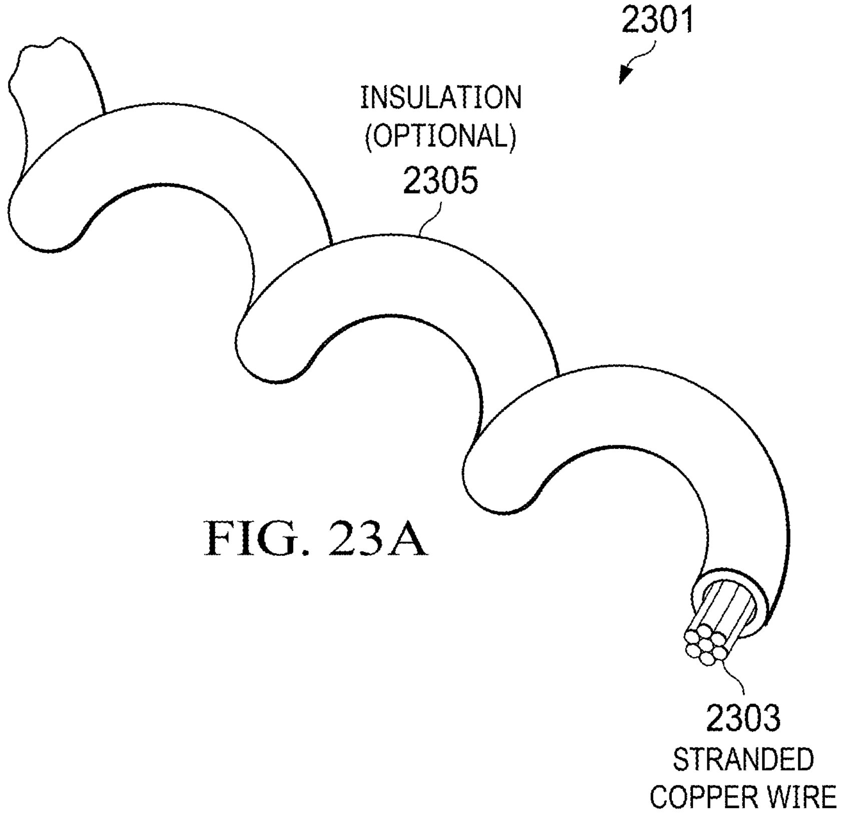
FIGS. 23A, 23B, 24A, 24B, and 24C depict helical wires.
Figure 23B:
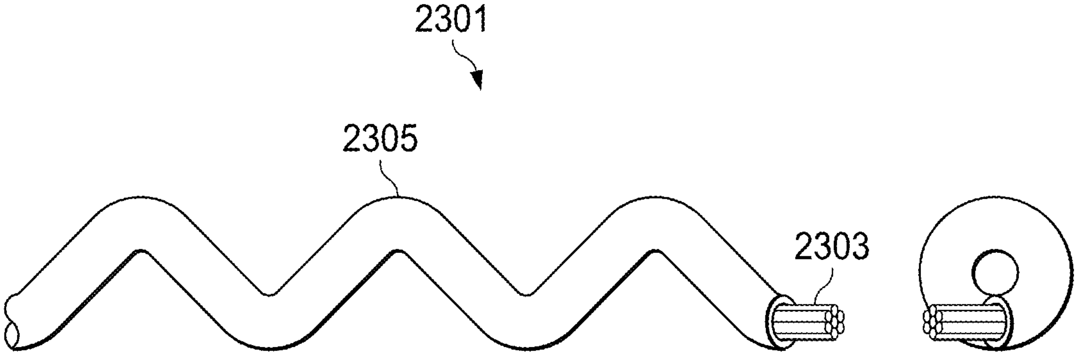
Figure 24A:
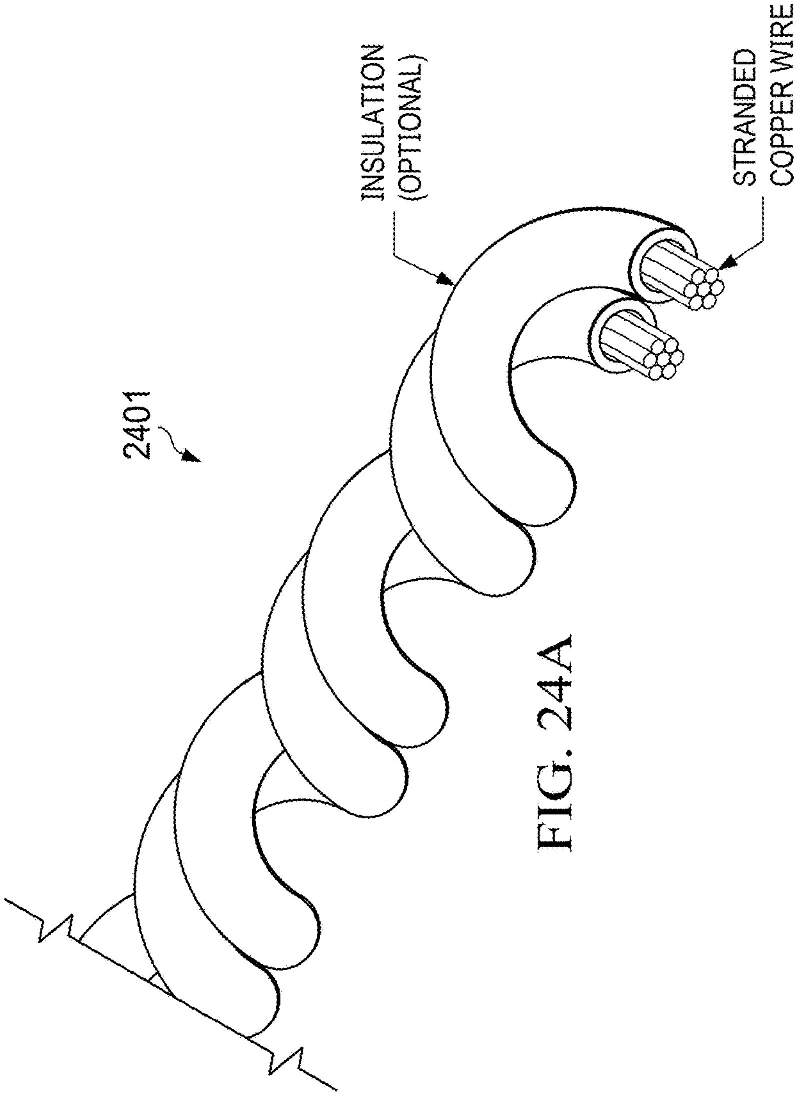
Figure 24B:
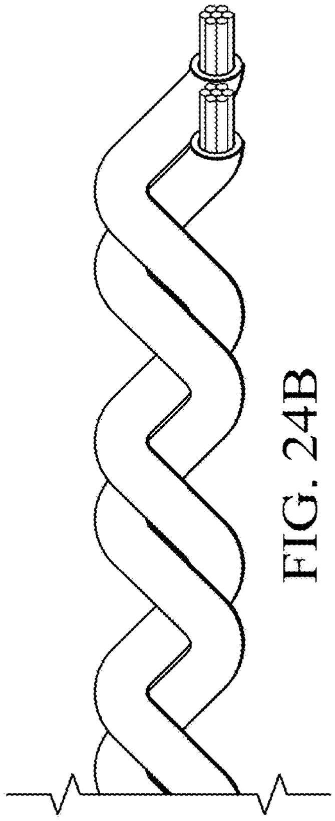
Figure 24C:
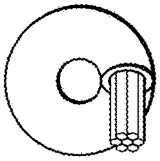

As depicted in FIGS. 23A and 23B a helical stretchable wire 2301 is shown. The helical stretchable wire 2301 depicted in FIG. 23 is arranged in a helical pattern. The helical stretchable wire 2301 of FIG. 23 includes stranded copper 2303 and an optional film of insulation 2305. Two or more stretchable wires may be routed together as a stretchable bundle 2401, as depicted in FIG. 24.

Figures 25A, 25B, 25C:
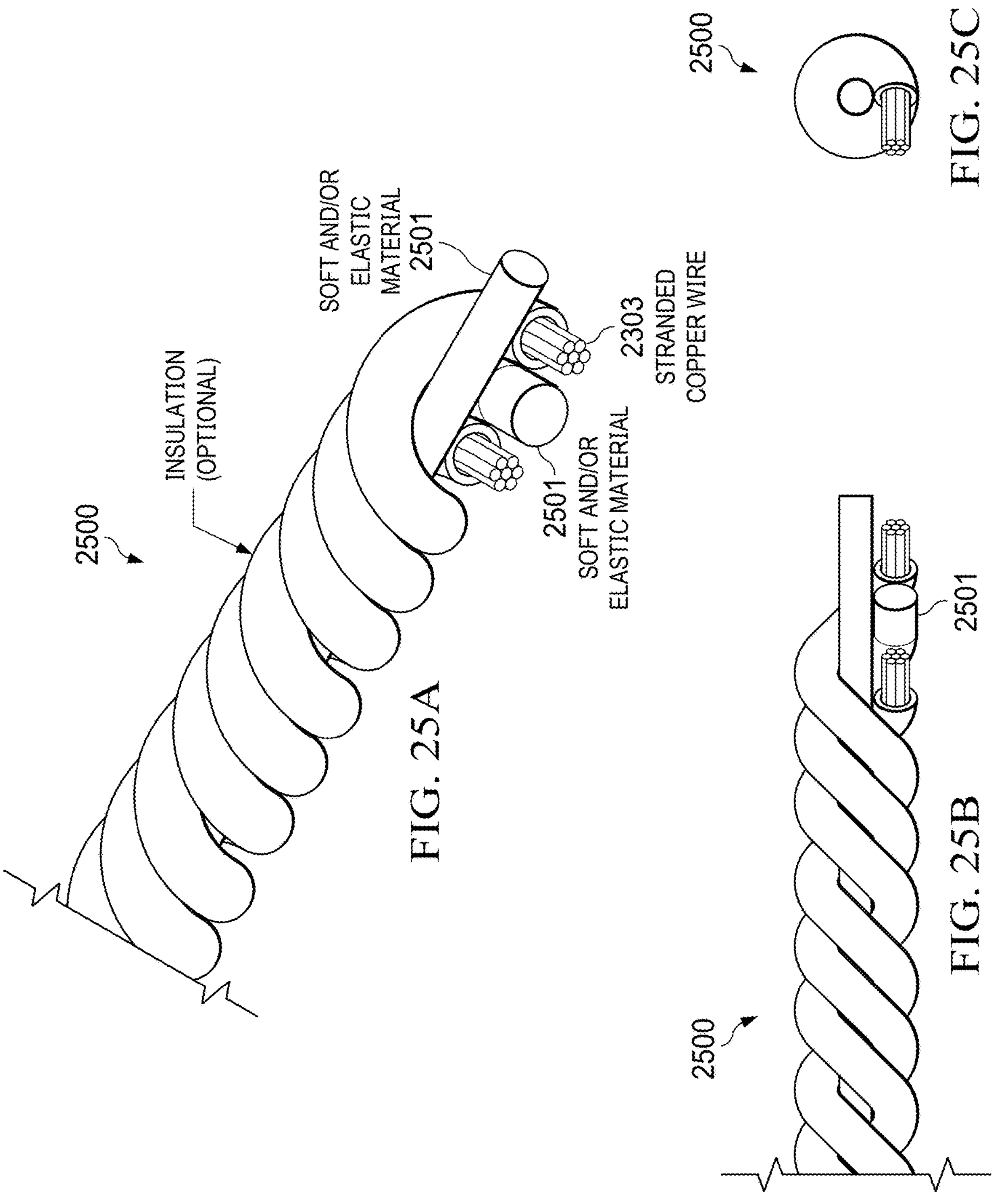
FIGS. 25A, 25B, and 25C depict alternative helical wire implementations.

Turning to FIGS. 25A, 25B, and 25C, in at least some embodiments, soft and/or elastic materials 2501 including, as non-limiting examples, cotton, lycra, spandex, elastane, or other suitable materials, may be routed along the central axis of the helix or routed in a helical shape along with the copper wire 2303.

Figure 26A:
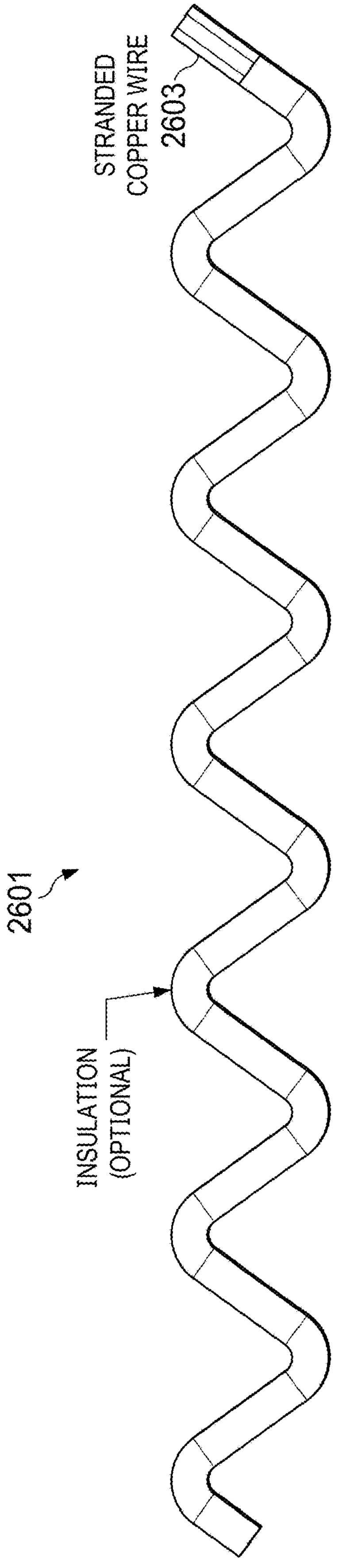
FIGS. 26A and 26B depict additional helical wire implementations.
Figure 26B:
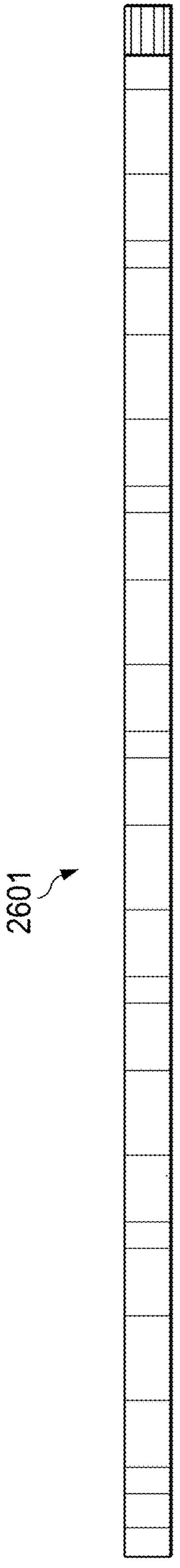

Referring to an elevation view FIG. 26A and a top plan view FIG. 26B, a representative sine wave stretchable wire 2601 is depicted. The depicted sine wave stretchable wire 2601 is accordion-like. As depicted in FIGS. 26A and 26B, copper stranding 2603 is arranged in a sine wave pattern and may be insulated or uninsulated.

Figure 27:
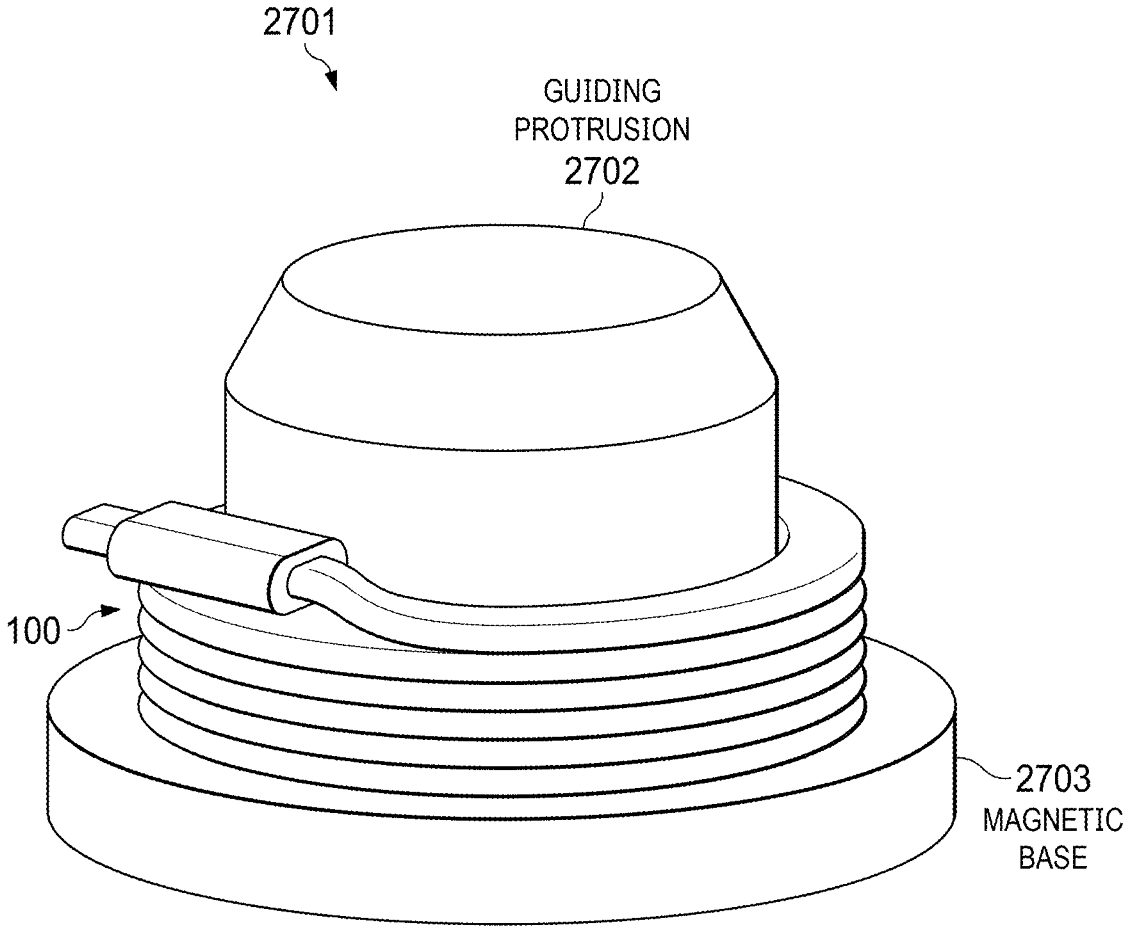
FIG. 27 depicts a representative cable storage device.

FIG. 27 illustrates a perspective view of a representative cable storage device 2701. The cable storage device 2701 depicted in FIG. 27 includes a guiding protrusion with 2701 a chamfered, rounded, or tapered shape. The guiding protrusion guides magnetized cable assembly 100 into place during storage. The cable device 2701 of FIG. 27 further includes a magnetic base 2703 of a magnetic material and/or including another a separate part of a magnetic material. Magnetic attraction between the magnetized cable assembly 100 and the base 2703 holds a portion of magnetized cable assembly 100 in place during coiling, etc.

Figure 28:
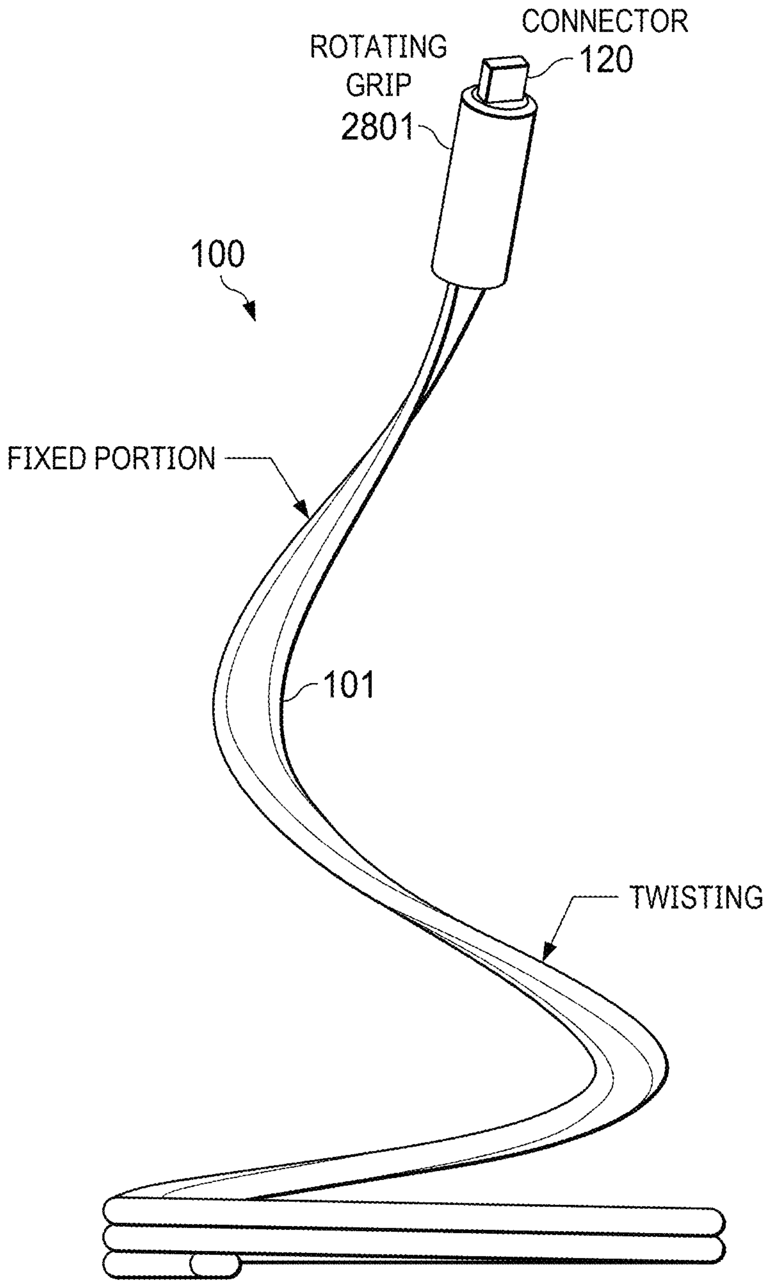
FIG. 28 illustrates a rotating grip for use with a magnetized cable assembly.

FIG. 28 illustrates a rotating grip 2801 for use with magnetized cable assembly 100. When an end of the cable assembly 100 is pulled by a user, the cable may tend to twist as shown in FIG. 10, causing frustration for the user. The rotating grip 2801 is rotatable with respect to EFMC 101 and the cable connector 120 allowing the cable assembly 100 to untwist automatically as needed.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A magnetized cable comprising:

one or more electrically conductive wires; and an elongated flexible magnetized component (EFMC), wherein the EFMC includes a pliable binder comprised primarily of a polymer and magnetic particles distributed within the polymer, wherein:

the EFMC produces a persistent magnetic field;

at least a first portion of the EFMC is magnetically attracted to at least a second portion of the EFMC; and magnetic attraction between the first and second portions of the EFMC facilitates manipulating the EFMC from an uncoiled state to a coiled state.

2. The magnetized cable of claim 1, wherein a width dimension of a cross section of the magnetized cable is greater than a height dimension, wherein the width dimension is perpendicular to the height dimension.

3. The magnetized cable of claim 2, wherein:

the EFMC includes first and second major surfaces, wherein the first and second major surfaces are in contact or close proximity when the EFMC is in the coiled state;

the first major surface lies within a first polarity region of the persistent magnetic field and the second major surface lies within a second polarity region of the persistent magnetic field; and the first polarity region is a north pole, and the second polarity region is a south pole.

4. The magnetized cable of claim 2, wherein:

the EFMC includes first and second major surfaces, wherein the first and second major surfaces are in contact or close proximity when the EFMC is in the coiled state;

a first major surface lies within a first polarity region of the persistent magnetic field and a second major surface lies within a second polarity region of the persistent magnetic field; and the first and second polarity regions contain an alternating arrangement of north and south poles, wherein the alternating arrangement includes at least one north pole and one south pole.

5. The magnetized cable of claim 2, wherein the coiled state of the EFMC comprises a spiral form factor.

6. The magnetized cable of claim 5, wherein the one or more electrically conductive wires include an embedded wire embedded in the EFMC and wherein a central axis of the embedded wire and a central plane of the EFMC are vertically aligned.

7. The magnetized cable of claim 6, wherein a diameter of the embedded wire and a vertical dimension of the EFMC are substantially equal wherein no portion of the EFMC is present above or below a circumference of the embedded wire.

8. The magnetized cable of claim 5, wherein the one or more electrically conducive wires include a twisted bundle, including two or more wires, embedded in the EFMC and wherein a central axis of the twisted bundle and a central plane of the EFMC are vertically aligned.

9. The magnetized cable of claim 8, wherein a diameter of the twisted bundle and a vertical dimension of the EFMC are substantially equal wherein no portion of the EFMC is present above or below a circumference of the twisted bundle.

10. The magnetized cable of claim 5, wherein the one or more electrically conductive wires include at least one wire routed alongside the EFMC.

11. The magnetized cable of claim 2, wherein a form factor of the EFMC is a helical form factor.

12. The magnetized cable of claim 11, wherein the one or more electrically conductive wires include an embedded wire, wherein the embedded wire comprises a wire embedded in the EFMC, and wherein the central axis of the embedded wire and the central axis of the EFMC are aligned.

13. The magnetized cable of claim 12, wherein a diameter of the embedded wire and a vertical dimension of the EFMC are substantially equal wherein no portion of the EFMC is present above or below a circumference of the embedded wire.

14. The magnetized cable of claim 11, wherein the one or more electrically conductive wires include a twisted bundle, including two or more wires, embedded in the EFMC and wherein the central axis of the twisted bundle and the central axis of the EFMC are aligned.

15. The magnetized cable of claim 14, wherein a diameter of the twisted bundle and a vertical dimension of the EFMC are substantially equal wherein no portion of the EFMC is present above or below a circumference of the twisted bundle.

16. The magnetized cable of claim 11, wherein the one or more electrically conductive wires include one or more stretchable wires embedded in the EFMC, wherein a central axis of each of the one or more stretchable wires and the central plane of the EFMC are vertically aligned.

17. The magnetized cable of claim 11, further comprising one or more stretchable wires routed alongside the EFMC and wherein a central axis of at least one of the one or more stretchable wires and a central plane of the EFMC are vertically aligned.

18. The magnetized cable of claim 2, wherein the coiled state of the EFMC comprises a preferred coiled state imparted by a heat treating process.

19. The magnetized cable of claim 1, wherein:

the EFMC includes first and second major surfaces, wherein the first and second major surfaces are in contact or close proximity when the EFMC is in the coiled state;

the first major surface lies within a first polarity region of the persistent magnetic field and the second major surface lies within a second polarity region of the persistent magnetic field; and the first polarity region is a north pole, and the second polarity region is a south pole.

20. The magnetized cable of claim 1, wherein:

the EFMC includes first and second major surfaces, wherein the first and second major surfaces are in contact or close proximity when the EFMC is in the coiled state;

a first major surface lies within a first polarity region of the persistent magnetic field and a second major surface lies within a second polarity region of the persistent magnetic field; and the first and second polarity regions contain an alternating arrangement of north and south poles, wherein the alternating arrangement includes at least one north pole and one south pole.

21. The magnetized cable of claim 1, further comprising a braided sheath, surrounding the EFMC and the one or more electrically conductive wires, constructed of stretchable yarns including any one or more of: latex, spandex, and elastane.

22. The magnetized cable of claim 21, further comprising a lubricant or surface coating applied to one or more components selected from: the one or more electrically conductive wires, the EFMC, and the braided sheath.

23. The magnetized cable of claim 22, wherein the lubricant is a dry lubricant.

24. The magnetized cable of claim 1, wherein at least one of the one or more electrically conductive wires includes wire insulation and wherein the wire insulation is comprised of at least one of: PTFE and a low friction polymer other than PTFE.

25. The magnetized cable of claim 1, further comprising a braided sheath constructed of waxed yarn surrounding the EFMC and the one or more electrically conductive wires.

26. The magnetized cable of claim 1, further comprising a sheath surrounding the EFMC and the one or more electrically conductive wires, wherein the sheath is comprised of at least one of: PTFE and another low friction polymer.

27. The magnetized cable of claim 1, wherein the EFMC has a preferred and persistent shape imparted by a heat treating process.

28. The magnetic cable of claim 1 further comprising at least one rotating grip.

29. A method for manufacturing a magnetized cable comprising:

obtaining a compound comprising a polymer and magnetic particles;

extruding the compound around one or more wires to create an EFMC with one or more embedded wires;

cutting the EFMC and one or more wires to a desired length;

applying a magnetic field to magnetize the EFMC;

positioning the EFMC and wires in a helical shape;

heat treating the EFMC and wires to impart a persistent helical shape to the EFMC.

30. A method for manufacturing a magnetic cable comprising:

obtaining a compound comprising a polymer and magnetic particles;

extruding the compound to produce an elongated flexible magnetic component (EFMC);

routing stretchable wires alongside the EFMC;

applying a braided textile or extruded polymer sheath around the EFMC;

cutting the EFMC to a desired length and installing a connector at each end;

applying a magnetic field to magnetize the EFMC;

positioning the EFMC and wires in a coiled state comprising a helical shape;

heat treating the EFMC and wires to impart the helical shape as a persistent helical shape to the EFMC.

* * * * *